US011026115B2

(12) United States Patent
Zhang et al.

(10) Patent No.: US 11,026,115 B2
(45) Date of Patent: Jun. 1, 2021

(54) MULTI-AIR-INTERFACE COMMUNICATION METHOD AND APPARATUS

(71) Applicant: Huawei Technologies Co., Ltd., Guangdong (CN)

(72) Inventors: Jian Zhang, Shenzhen (CN); Yada Huang, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 25 days.

(21) Appl. No.: 16/368,018

(22) Filed: Mar. 28, 2019

(65) Prior Publication Data
US 2019/0223049 A1 Jul. 18, 2019

Related U.S. Application Data

(63) Continuation of application No. PCT/CN2017/103966, filed on Sep. 28, 2017.

(30) Foreign Application Priority Data

Sep. 29, 2016 (CN) .......................... 201610865612.6

(51) Int. Cl.
*H04W 28/02* (2009.01)
*H04W 52/00* (2009.01)
(Continued)

(52) U.S. Cl.
CPC ....... *H04W 28/0278* (2013.01); *H04W 24/10* (2013.01); *H04W 28/02* (2013.01);
(Continued)

(58) Field of Classification Search
CPC ....... Y02D 70/00; Y02D 70/20; H04W 24/10; H04W 92/10; H04W 52/00; H04W 72/14;
(Continued)

(56) References Cited

U.S. PATENT DOCUMENTS 8,537,767 B2 * 9/2013 Zhang ................. H04W 52/365
370/329
9,253,595 B1 * 2/2016 Talley ................... H04W 64/00
(Continued)

FOREIGN PATENT DOCUMENTS

CN 102422686 A 4/2012
CN 103024902 A 4/2013
(Continued)

OTHER PUBLICATIONS

R1-167047 Ericsson,"On smallest schedulable unit",TSG-RAN WG1 #86,Gothenburg, Sweden, Aug. 22-26, 2016,total 2 pages.
(Continued)

*Primary Examiner* — Man U Phan
(74) *Attorney, Agent, or Firm* — Womble Bond Dickinson (US) LLP

(57) ABSTRACT

This application provides a multi-air-interface communication method and an apparatus. In the method, a mobile terminal supports a plurality of types of air interfaces. The method resolves a BSR sending problem, a PHR reporting problem, and a DRX problem in a case of a plurality of air interfaces. The method that resolves the BSR sending problem in the case of the plurality of air interfaces enables a base station to more accurately allocate a radio resource to the mobile terminal based on a BSR sent on each air interface by the mobile terminal. The method that resolves the PHR reporting problem in the case of the plurality of air interfaces enables the base station to more accurately allocate the radio resource to the mobile terminal. The method that resolves the DRX problem in the case of the plurality of air interfaces is more beneficial to power saving of the mobile terminal.

13 Claims, 9 Drawing Sheets

(51) Int. Cl.

| | |
|---|---|
| *H04W 52/36* | (2009.01) |
| *H04W 72/04* | (2009.01) |
| *H04W 52/02* | (2009.01) |
| *H04W 24/10* | (2009.01) |
| *H04W 76/28* | (2018.01) |
| *H04W 72/14* | (2009.01) |
| *H04W 92/10* | (2009.01) |
| *H04W 88/06* | (2009.01) |

(52) U.S. Cl.
CPC ........... *H04W 52/00* (2013.01); *H04W 52/02* (2013.01); *H04W 52/36* (2013.01); *H04W 72/04* (2013.01); *H04W 72/0446* (2013.01); *H04W 72/14* (2013.01); *H04W 76/28* (2018.02); *H04W 92/10* (2013.01); *H04W 88/06* (2013.01); *Y02D 30/70* (2020.08)

(58) Field of Classification Search
CPC ..... H04W 88/06; H04W 28/02; H04W 52/36; H04W 72/04; H04W 28/0278; H04W 76/28; H04W 7/0446; H04W 52/02
USPC .......................................................... 370/329
See application file for complete search history.

(56) References Cited

U.S. PATENT DOCUMENTS

| | | | | |
|---|---|---|---|---|
| 9,295,077 | B2* | 3/2016 | Guo | H04W 28/0278 |
| 9,451,600 | B2* | 9/2016 | Park | H04W 52/0238 |
| 9,736,722 | B2* | 8/2017 | Guo | H04W 72/1268 |
| 9,763,151 | B2* | 9/2017 | Kim | H04L 5/00 |
| 9,900,868 | B2* | 2/2018 | Lee | H04W 72/1284 |
| 9,949,214 | B2* | 4/2018 | Park | H04W 28/06 |
| 9,999,033 | B2* | 6/2018 | Lee | H04W 28/0278 |
| 10,070,351 | B1* | 9/2018 | Oroskar | H04W 36/0072 |
| 10,075,888 | B2* | 9/2018 | Hampel | H04W 36/14 |
| 10,201,030 | B2* | 2/2019 | Wu | H04L 5/0035 |
| 10,299,224 | B2* | 5/2019 | Kwon | H04W 72/0453 |
| 10,342,035 | B2* | 7/2019 | Lee | H04W 72/1278 |
| 10,349,406 | B2* | 7/2019 | Dinan | H04W 74/08 |
| 10,362,590 | B2* | 7/2019 | Hong | H04B 7/2612 |
| 10,448,374 | B2* | 10/2019 | Kim | H04W 52/365 |
| 10,542,471 | B1* | 1/2020 | Oroskar | H04W 36/0022 |
| 10,555,208 | B2* | 2/2020 | Lee | H04W 28/0278 |
| 2004/0120283 | A1 | 6/2004 | Rezaiifar et al. | |
| 2010/0291963 | A1 | 11/2010 | Patel et al. | |
| 2014/0018124 | A1* | 1/2014 | Ahn | H04W 24/10 455/522 |
| 2014/0177560 | A1 | 6/2014 | Guo | |
| 2015/0327115 | A1 | 11/2015 | Park et al. | |
| 2016/0219475 | A1 | 7/2016 | Kim | |

FOREIGN PATENT DOCUMENTS

| | | |
|---|---|---|
| CN | 104919846 A | 9/2015 |
| CN | 105191216 A | 12/2015 |
| CN | 105850204 A | 8/2016 |
| CN | 105874869 B | 7/2019 |
| EP | 3051736 A1 | 8/2016 |
| WO | 2016022001 A1 | 2/2016 |

OTHER PUBLICATIONS

R2-165341 Ericsson,"Uplink scheduling for NR",3GPP TSG-RAN WG2 #95,Gothenburg, Sweden, Aug. 22-26, 2016,total 4 pages.
R2-165662 LG Electronics Inc"Scheduling in New RAT with multiple connectivity in NR",3GPP TSG-RAN WG2 Meeting #95,Gothenburg, Sweden, Aug. 22-26, 2016,total 4 pages.

* cited by examiner

MULTI-AIR-INTERFACE COMMUNICATION METHOD AND APPARATUS

CROSS-REFERENCE TO RELATED APPLICATIONS

This application is a continuation of International Application No. PCT/CN2017/103966, filed on Sep. 28, 2017, which claims priority to Chinese Patent Application No. 201610865612.6, filed on Sep. 29, 2016. The disclosures of the aforementioned applications are hereby incorporated by reference in their entireties.

TECHNICAL FIELD

This application relates to communications technologies, and in particular, to a multi-air-interface communication method and an apparatus.

BACKGROUND

The air interface (AI) refers to a specification of wireless transmission between a base station and a mobile terminal. The air interface is also referred to as an air interface. In an existing network system, each cell supports only one type of air interface. For example, a physical-layer frame structure used by an air interface supported by a Long Term Evolution (LTE) system and a Long Term Evolution Advanced (LTE advanced, LTE-A) system is a 1 ms subframe.

As a network system evolves, a future mobile communications system (for example, the fifth generation mobile communication (5G)) supports more diversified requirements and scenarios of services. In an existing design manner, a single type of air interface is used for one cell in a network system, which makes it difficult to satisfy quality of service (QoS) requirements of the services at the same time, or may cause low radio resource utilization.

SUMMARY

This application provides a multi-air-interface communication method and an apparatus, to satisfy QoS requirements of various services, and improve radio resource utilization.

A first aspect of this application provides a multi-air-interface communication method, including: receiving, by a mobile terminal, a correspondence between each logical channel and each air interface that is sent by a base station, where the mobile terminal supports at least two types of air interfaces; and sending, by the mobile terminal, a buffer status report BSR to a base station based on resources of the two types of air interfaces and the correspondence when data arrives at a buffer of at least one logical channel of the mobile terminal, where the BSR includes information about the buffer of the at least one logical channel.

Optionally, the at least one logical channel includes a first-type logical channel and/or a second-type logical channel, an air interface corresponding to the first-type logical channel is a first air interface, and an air interface corresponding to the second-type logical channel is a second air interface, where a subframe length of the first air interface is greater than a subframe length of the second air interface.

Optionally, when the at least one logical channel includes the first-type logical channel and the second-type logical channel, the sending, by the mobile terminal, a BSR to a base station based on resources of the two types of air interfaces and the correspondence includes:

determining, by the mobile terminal based on the correspondence, that the air interface corresponding to the first-type logical channel is the first air interface and the air interface corresponding to the second-type logical channel is the second air interface, determining, by the mobile terminal, whether the second air interface and the first air interface have an available uplink resource for sending a BSR of the first-type logical channel and a BSR of the second-type logical channel; and when the second air interface has the available uplink resource for sending the BSR of the first-type logical channel and the BSR of the second-type logical channel, sending, by the mobile terminal, the BSR of the first-type logical channel and the BSR of the second-type logical channel to the base station by using an uplink resource of the second air interface; or sending, by the mobile terminal, the BSR of the second-type logical channel to the base station by using an uplink resource of the second air interface, and sending the BSR of the first-type logical channel to the base station by using an uplink resource of the first air interface.

Optionally, when the at least one logical channel includes the first-type logical channel and the second-type logical channel, the sending, by the mobile terminal, a BSR to a base station based on resources of the two types of air interfaces and the correspondence includes:

determining, by the mobile terminal based on the correspondence, that the air interface corresponding to the first-type logical channel is the first air interface and the air interface corresponding to the second-type logical channel is the second air interface;

determining, by the mobile terminal, whether the second air interface and the first air interface have an available uplink resource for sending a BSR of the first-type logical channel and a BSR of the second-type logical channel; and when the second air interface does not have the available uplink resource for sending the BSR of the first-type logical channel and the BSR of the second-type logical channel, sending, by the mobile terminal, a scheduling request to the base station through the second air interface;

receiving, by the mobile terminal, uplink grant for the second air interface that is sent by the base station to the mobile terminal based on the scheduling request; and sending, by the mobile terminal, the BSR of the first-type logical channel and the BSR of the second-type logical channel to the base station by using an uplink resource granted to the second air interface; or sending, by the mobile terminal, the BSR of the second-type logical channel to the base station by using an uplink resource granted to the second air interface, and sending the BSR of the first-type logical channel to the base station by using an uplink resource of the first air interface.

Optionally, when the at least one logical channel includes the first-type logical channel and the second-type logical channel, the sending, by the mobile terminal, a BSR to a base station based on resources of the two types of air interfaces and the correspondence includes:

determining, by the mobile terminal based on the correspondence, that the air interface corresponding to the first-type logical channel is the first air interface and the air interface corresponding to the second-type logical channel is the second air interface;

determining, by the mobile terminal, whether the second air interface and the first air interface have an available uplink resource for sending a BSR of the first-type logical channel and a BSR of the second-type logical channel; and when an uplink resource of the second air interface is sufficient for sending only some BSRs in the BSR of the first-type logical channel and the BSR of the second-type logical channel, sending, by the mobile terminal, a BSR of a logical channel whose priority is relatively high to the base station by using the uplink resource of the second air interface, or sending, by the mobile terminal, the BSR of the second-type logical channel to the base station by using the uplink resource of the second air interface; or when the first air interface has the available uplink resource, sending, by the mobile terminal, a BSR of a remaining logical channel by using an uplink resource of the first air interface, where the remaining logical channel is a logical channel, in the at least one logical channel, other than a logical channel sent on the second air interface; or when the first air interface does not have the available uplink resource, sending, by the mobile terminal, a BSR of the remaining logical channel to the base station by using an uplink resource allocated by the base station based on a BSR sent on the second air interface.

Optionally, when the at least one logical channel includes the first-type logical channel and the second-type logical channel, the sending, by the mobile terminal, a BSR to a base station based on resources of the two types of air interfaces and the correspondence includes:

determining, by the mobile terminal based on the correspondence, that the air interface corresponding to the first-type logical channel is the first air interface and the air interface corresponding to the second-type logical channel is the second air interface;

determining, by the mobile terminal, whether the second air interface and the first air interface have an available uplink resource for sending a BSR of the first-type logical channel and a BSR of the second-type logical channel; and when both the second air interface and the first air interface have the available uplink resource for sending the BSR of the first-type logical channel and the BSR of the second-type logical channel, sending, by the mobile terminal, the BSR of the second-type logical channel to the base station through the second air interface, and sending, by the mobile terminal, the BSR of the first-type logical channel to the base station by using an uplink resource of the first air interface; or when the second air interface does not have the available uplink resource and the first air interface has the available uplink resource, requesting, by the mobile terminal, the base station to allocate an uplink resource to the second air interface, sending the BSR of the second logical channel to the base station by using the uplink resource of the second air interface that is allocated by the base station, and sending, by the mobile terminal, the BSR of the first-type logical channel to the base station by using an uplink resource of the first air interface; or when the first air interface does not have the available uplink resource and the second air interface has the available uplink resource, requesting, by the mobile terminal, the base station to allocate an uplink resource to the first air interface, sending the BSR of the first logical channel to the base station by using the uplink resource of the first air interface that is allocated by the base station, and sending, by the mobile terminal, the BSR of the second logical channel to the base station by using an uplink resource of the second air interface.

Optionally, when the at least one logical channel includes only the first-type logical channel, the sending, by the mobile terminal, a BSR to a base station based on resources of the two types of air interfaces and the correspondence includes:

determining, by the mobile terminal based on the correspondence, that the air interface corresponding to the first-type logical channel is the first air interface;

determining, by the mobile terminal, whether the first air interface has an available uplink resource for sending a BSR of the first-type logical channel; and when the first air interface has the available uplink resource, sending, by the mobile terminal, the BSR of the first-type logical channel to the base station by using the available uplink resource of the first air interface; or when the first air interface does not have the available uplink resource, sending, by the mobile terminal, a scheduling request to the base station through the first air interface, and receiving uplink grant for the first air interface that is sent by the base station based on the scheduling request; and sending, by the mobile terminal, the BSR of the first-type logical channel to the mobile terminal by using an uplink resource granted to the first air interface.

Optionally, when the at least one logical channel includes only the second-type logical channel, the sending, by the mobile terminal, a BSR to a base station based on resources of the two types of air interfaces and the correspondence includes:

determining, by the mobile terminal based on the correspondence, that the air interface corresponding to the second-type logical channel is the second air interface;

determining, by the mobile terminal, whether the second air interface has an available uplink resource for sending a BSR of the second-type logical channel; and when the second air interface has the available uplink resource, sending, by the mobile terminal, the BSR of the second-type logical channel to the base station by using the available uplink resource of the second air interface; or when the second air interface does not have the available uplink resource, sending, by the mobile terminal, a scheduling request to the base station through the second air interface, and receiving uplink grant for the second air interface that is sent by the base station based on the scheduling request; and sending, by the mobile terminal, the BSR of the second-type logical channel to the mobile terminal by using an uplink resource granted to the second air interface.

A second aspect of this application provides a multi-air-interface communication method, including: sending, by a base station, a correspondence between each logical channel and each air interface to a mobile terminal, where the mobile terminal supports at least two types of air interfaces; and receiving, by the base station on at least one air interface in the two types of air interfaces, a buffer status report BSR sent by the mobile terminal, where the BSR includes information about a buffer of the at least one logical channel, and allocating uplink grant to the at least one logical channel based on the BSR.

Optionally, the method further includes: receiving, by the base station, a scheduling request SR sent by the mobile terminal on the at least one type of air interface, and allocating uplink grant to an air interface on which the SR is received.

A third aspect of this application provides a multi-air-interface communication method, including: receiving, by a mobile terminal, a reference signal sent by a base station, where the mobile terminal supports at least two types of air interfaces, and learning, by the mobile terminal, of a downlink path loss of each type of air interface based on a measurement result of the reference signal, learning of a PHR of the each type of air interface based on the downlink path loss of the each type of air interface, and sending the PHR of the each type of air interface to the base station.

Optionally, the receiving, by a mobile terminal, a reference signal sent by a base station includes:
  receiving, by the mobile terminal, the reference signal sent by the base station on a first air interface,
  the learning, by the mobile terminal, of a downlink path loss of each type of air interface based on a measurement result of the reference signal includes:
  estimating, by the mobile terminal, a downlink path loss of the first air interface based on the measurement result of the reference signal received on the first air interface; and
  determining, by the mobile terminal, that the downlink path loss of the first air interface is the downlink path loss of the each type of air interface; and
  the learning, by the mobile terminal, of a power headroom report PHR of the each type of air interface based on the downlink path loss of the each type of air interface includes:
  calculating, by the mobile terminal, a PHR of the first air interface based on the downlink path loss of the first air interface, and
  determining, by the mobile terminal, that the PHR of the public air interface is a PHR of each air interface.

Optionally, the first air interface is pre-configured for the mobile terminal by the base station, the first air interface is different from the at least two types of air interfaces supported by the mobile terminal, and the first air interface is used by the base station to send the reference signal, so that the mobile terminal calculates the downlink path loss. Alternatively, the first air interface is any type of air interface in the at least two types of air interfaces supported by the mobile terminal.

Optionally, the receiving, by a mobile terminal, a reference signal sent by a base station includes:
  receiving, by the mobile terminal, a reference signal separately sent by the base station on each type of air interface in the at least two types of air interfaces supported by the mobile terminal; and
  the learning, by the mobile terminal, of a downlink path loss of each type of air interface based on a measurement result of the reference signal includes:
  calculating, by the mobile terminal, a downlink path loss of each air interface based on a measurement result of the reference signal received on the each type of air interface.

A fourth aspect of this application provides a multi-air-interface communication method, including: receiving, by a mobile terminal, DRX configuration information sent by a base station, where the DRX configuration information includes DRX parameters of at least two air interface groups supported by the mobile terminal, where the DRX parameters of the air interface groups are different from each other, each air interface group includes at least one air interface, the at least one air interface in each air interface group has a same DRX parameter, and the mobile terminal respectively applies the DRX parameters to the air interfaces in the air interface groups based on the DRX parameters of the air interface groups.

Optionally, the DRX parameters include at least one of the following information: an on duration timer, an inactivity timer, or a hybrid automatic repeat request round trip time timer.

Optionally, on duration timers of the air interface groups have a same timing time.

A fifth aspect of this application provides a mobile terminal, including:
  a receiving module, configured to receive a correspondence between each logical channel and each air interface that is sent by a base station, where the mobile terminal supports at least two types of air interfaces; and
  a sending module, configured to send a buffer status report BSR to a base station based on resources of the two types of air interfaces and the correspondence when data arrives at a buffer of at least one logical channel of the mobile terminal, where the BSR includes information about the buffer of the at least one logical channel.

Optionally, the at least one logical channel includes a first-type logical channel and/or a second-type logical channel, an air interface corresponding to the first-type logical channel is a first air interface, and an air interface corresponding to the second-type logical channel is a second air interface, where a subframe length of the first air interface is greater than a subframe length of the second air interface.

Optionally, when the at least one logical channel includes the first-type logical channel and the second-type logical channel, the sending module includes:
  a determining submodule, configured to determine, based on the correspondence, that the air interface corresponding to the first-type logical channel is the first air interface and the air interface corresponding to the second-type logical channel is the second air interface;
  a judgment submodule, configured to determine whether the second air interface and the first air interface have an available uplink resource for sending a BSR of the first-type logical channel and a BSR of the second-type logical channel; and
  a first sending submodule, configured to:
  when the second air interface has the available uplink resource for sending the BSR of the first-type logical channel and the BSR of the second-type logical channel, send the BSR of the first-type logical channel and the BSR of the second-type logical channel to the base station by using an uplink resource of the second air interface; or
  send the BSR of the second-type logical channel to the base station by using an uplink resource of the second air interface, and send the BSR of the first-type logical channel to the base station by using an uplink resource of the first air interface.

Optionally, when the at least one logical channel includes the first-type logical channel and the second-type logical channel, the sending module includes:
  a determining submodule, configured to determine, based on the correspondence, that the air interface corresponding to the first-type logical channel is the first air interface and the air interface corresponding to the second-type logical channel is the second air interface;

a judgment submodule, configured to determine whether the second air interface and the first air interface have an available uplink resource for sending a BSR of the first-type logical channel and a BSR of the second-type logical channel; and a second sending submodule, configured to: when the second air interface does not have the available uplink resource for sending the BSR of the first-type logical channel and the BSR of the second-type logical channel, send a scheduling request to the base station through the second air interface;

the receiving module is further configured to receive uplink grant for the second air interface that is sent by the base station to the mobile terminal based on the scheduling request; and the second sending submodule is further configured to: send the BSR of the first-type logical channel and the BSR of the second-type logical channel to the base station by using an uplink resource granted to the second air interface; or send the BSR of the second-type logical channel to the base station by using an uplink resource granted to the second air interface, and send the BSR of the first-type logical channel to the base station by using an uplink resource of the first air interface.

Optionally, when the at least one logical channel includes the first-type logical channel and the second-type logical channel, the sending module includes:

a determining submodule, configured to determine, based on the correspondence, that the air interface corresponding to the first-type logical channel is the first air interface and the air interface corresponding to the second-type logical channel is the second air interface;

a judgment submodule, configured to determine whether the second air interface and the first air interface have an available uplink resource for sending a BSR of the first-type logical channel and a BSR of the second-type logical channel; and a third sending submodule, configured to:

when an uplink resource of the second air interface is sufficient for sending only some BSRs in the BSR of the first-type logical channel and the BSR of the second-type logical channel, send a BSR of a logical channel whose priority is relatively high to the base station by using the uplink resource of the second air interface, or send the BSR of the second-type logical channel to the base station by using the uplink resource of the second air interface; or when the first air interface has the available uplink resource, send a BSR of a remaining logical channel by using an uplink resource of the first air interface, where the remaining logical channel is a logical channel, in the at least one logical channel, other than a logical channel sent on the second air interface; or when the first air interface does not have the available uplink resource, send a BSR of the remaining logical channel to the base station by using an uplink resource allocated by the base station based on a BSR sent on the second air interface.

Optionally, when the at least one logical channel includes the first-type logical channel and the second-type logical channel, the sending module includes:

a determining submodule, configured to determine, based on the correspondence, that the air interface corresponding to the first-type logical channel is the first air interface and the air interface corresponding to the second-type logical channel is the second air interface;

a judgment submodule, configured to determine whether the second air interface and the first air interface have an available uplink resource for sending a BSR of the first-type logical channel and a BSR of the second-type logical channel; and a fourth sending submodule, configured to:

when both the second air interface and the first air interface have the available uplink resource for sending the BSR of the first-type logical channel and the BSR of the second-type logical channel, send the BSR of the second-type logical channel to the base station through the second air interface, and send, by the mobile terminal, the BSR of the first-type logical channel to the base station by using an uplink resource of the first air interface; or when the second air interface does not have the available uplink resource and the first air interface has the available uplink resource, request the base station to allocate an uplink resource to the second air interface, send the BSR of the second logical channel to the base station by using the uplink resource of the second air interface that is allocated by the base station, and send the BSR of the first-type logical channel to the base station by using an uplink resource of the first air interface; or when the first air interface does not have the available uplink resource and the second air interface has the available uplink resource, request the base station to allocate an uplink resource to the first air interface, send the BSR of the first logical channel to the base station by using the uplink resource of the first air interface that is allocated by the base station, and send the BSR of the second logical channel to the base station by using an uplink resource of the second air interface.

Optionally, when the at least one logical channel includes only the first-type logical channel, the sending module includes:

a determining submodule, configured to determine, based on the correspondence, that the air interface corresponding to the first-type logical channel is the first air interface;

a judgment submodule, configured to determine whether the first air interface has an available uplink resource for sending a BSR of the first-type logical channel; and a fifth sending submodule, configured to:

when the first air interface has the available uplink resource, send the BSR of the first-type logical channel to the base station by using the available uplink resource of the first air interface; or when the first air interface does not have the available uplink resource, send a scheduling request to the base station through the first air interface, and receive uplink grant for the first air interface that is sent by the base station based on the scheduling request; and send the BSR of the first-type logical channel to the mobile terminal by using an uplink resource granted to the first air interface.

Optionally, when the at least one logical channel includes only the second-type logical channel, the sending module includes:

a determining submodule, configured to determine, based on the correspondence, that the air interface corresponding to the second-type logical channel is the second air interface, a judgment submodule, configured to determine whether the second air interface has an available uplink resource for sending a BSR of the second-type logical channel; and a sixth sending submodule, configured to:

when the second air interface has the available uplink resource, send, by the mobile terminal, the BSR of the second-type logical channel to the base station by using the available uplink resource of the second air interface; or when the second air interface does not have the available uplink resource, send, by the mobile terminal, a scheduling request to the base station through the second air interface, receive uplink grant for the second air interface that is sent by the base station based on the scheduling request, and send the BSR of the second-type logical channel to the mobile terminal by using an uplink resource granted to the second air interface.

A sixth aspect of this application provides a base station, including: a sending module and a receiving module. The sending module is configured to send a correspondence between each logical channel and each air interface to a mobile terminal, where the mobile terminal supports at least two types of air interfaces. The receiving module is configured to: receive, on at least one air interface in the two types of air interfaces, a buffer status report BSR sent by the mobile terminal, where the BSR includes information about a buffer of the at least one logical channel. The sending module is further configured to allocate uplink grant to the at least one logical channel based on the BSR.

Optionally, the base station further includes an allocation module. The receiving module is further configured to receive a scheduling request SR sent on the at least one type of air interface by the mobile terminal. The allocation module is configured to allocate uplink grant to an air interface of the SR received by the receiving module.

A seventh aspect of this application provides a mobile terminal, including: a receiving module, an obtaining module, and a sending module. The receiving module is configured to receive a reference signal sent by a base station. The mobile terminal supports at least two types of air interfaces. The obtaining module is configured to: learn of a downlink path loss of each type of air interface based on a measurement result of the reference signal, and learn of a PHR of the each type of air interface based on the downlink path loss of the each type of air interface. The sending module is configured to send the PHR of the each type of air interface to the base station.

Optionally, the receiving module is specifically configured to receive the reference signal sent by the base station on a first air interface. Correspondingly, the obtaining module is specifically configured to: estimate a downlink path loss of the first air interface based on the measurement result of the reference signal received on the first air interface, determine that the downlink path loss of the first air interface is the downlink path loss of the each type of air interface, calculate a PHR of the first air interface based on the downlink path loss of the first air interface, and determine that the PHR of the public air interface is a PHR of each air interface.

Optionally, the first air interface is pre-configured for the mobile terminal by the base station, the first air interface is different from the at least two types of air interfaces supported by the mobile terminal, and the first air interface is used by the base station to send the reference signal, so that the mobile terminal calculates the downlink path loss. Alternatively, the first air interface is any type of air interface in the at least two types of air interfaces supported by the mobile terminal.

Optionally, the receiving module is specifically configured to receive a reference signal separately sent by the base station on each type of air interface in the at least two types of air interfaces supported by the mobile terminal. Correspondingly, the obtaining module is specifically configured to calculate a downlink path loss of each air interface based on a measurement result of the reference signal received on the each type of air interface.

An eighth aspect of this application provides a mobile terminal, including a receiving module and a processing module. The receiving module is configured to receive DRX configuration information sent by a base station, where the DRX configuration information includes DRX parameters of at least two air interface groups supported by the mobile terminal, where the DRX parameters of the air interface groups are different from each other, each air interface group includes at least one air interface, and the at least one air interface in each air interface group has a same DRX parameter. The processing module is configured to respectively apply the DRX parameters to air interfaces in the air interface groups based on the DRX parameters of the air interface groups.

Optionally, the DRX parameters include at least one of the following information: an on duration timer, an inactivity timer, or a hybrid automatic repeat request round trip time timer.

Optionally, on duration timers of the air interface groups have a same timing time.

A ninth aspect of this application provides a multi-air-interface communication method, including:

receiving, by a mobile terminal, uplink grant sent by a base station, where the uplink grant includes uplink grant of a first air interface and uplink grant of a second air interface;

determining, by the mobile terminal based on a pre-obtained correspondence between each logical channel and each air interface, a logical channel corresponding to the first air interface and a logical channel corresponding to the second air interface; and allocating, by the mobile terminal based on priorities of the logical channel corresponding to the first air interface and the logical channel corresponding to the second air interface, a resource of the uplink grant of the first air interface and a resource of the uplink grant of the second air interface to the logical channel corresponding to the first air interface and the logical channel corresponding to the second air interface.

Optionally, the allocating, by the mobile terminal based on priorities of the logical channel corresponding to the first air interface and the logical channel corresponding to the second air interface, a resource of the uplink grant of the first air interface and a resource of the uplink grant of the second air interface to the logical channel corresponding to the first air interface and the logical channel corresponding to the second air interface includes:

allocating, by the mobile terminal based on the priority of the logical channel corresponding to the first air interface, the resource of the uplink grant of the first air interface and/or the resource of the uplink grant of the second air interface to the logical channel corresponding to the first air interface; and when there is a remaining resource in the resource of the uplink grant of the first air interface and/or the resource of the uplink grant of the second air interface, allocating, by the mobile terminal based on the priority of the logical channel corresponding to the second air interface, the remaining resource to the logical channel corresponding to the second air interface.

Optionally, the allocating, by the mobile terminal based on priorities of the logical channel corresponding to the first air interface and the logical channel corresponding to the second air interface, a resource of the uplink grant of the first air interface and a resource of the uplink grant of the second air interface to the logical channel corresponding to the first air interface and the logical channel corresponding to the second air interface includes:

allocating, by the mobile terminal based on the priority of the logical channel corresponding to the second air interface, the resource of the uplink grant of the second air interface and/or the resource of the uplink grant of the first air interface to the logical channel corresponding to the second air interface, and when there is a remaining resource in the resource of the uplink grant of the second air interface and/or the resource of the uplink grant of the first air interface, allocating, by the mobile terminal based on the priority of the logical channel corresponding to the first air interface, the remaining resource to the logical channel corresponding to the first air interface.

A tenth aspect of this application provides a mobile terminal, including: a processor, a memory, and a communications interface, where the memory is configured to store an instruction, the communications interface is configured to communicate with another device, and the processor is configured to execute the instruction stored in the memory, to enable the mobile terminal to perform the method according to any aspect of the first aspect, the third aspect, the fourth aspect, and the ninth aspect of this application.

An eleventh aspect of this application provides a base station, including: a processor, a memory, and a communications interface, where the memory is configured to store an instruction, the communications interface is configured to communicate with another device, and the processor is configured to execute the instruction stored in the memory, to enable the base station to perform the method according to the second aspect of this application.

A twelfth aspect of this application provides a computer readable storage medium. The computer readable storage medium stores an instruction, and when the instruction is executed by a computing apparatus, a mobile terminal is enabled to perform an operation in the method according to any aspect of the first aspect, the third aspect, the fourth aspect, and the ninth aspect of this application.

A thirteenth aspect of this application provides a computer readable storage medium. The computer readable medium stores an instruction, and when the instruction is executed by a computing apparatus, the base station is enabled to perform an operation in the method according to the second aspect of this application.

A fourteenth aspect of this application provides a chip system. The chip system is applied to a mobile terminal. The system on chip includes at least one processor. The at least one processor is configured to execute a stored instruction, to enable the mobile terminal to perform an operation in the method according to any aspect of the first aspect, the third aspect, the fourth aspect, and the ninth aspect of this application.

A fifteenth aspect of this application provides a chip system. The chip system is applied to a base station. The system on chip includes at least one processor. The at least one processor is configured to execute a stored instruction, to enable the base station to perform an operation in the method according to the second aspect of this application.

A sixteenth aspect of this application provides a computer program product, applied to a mobile terminal. The computer program product includes an instruction, and when the instruction is executed by a computing apparatus, the mobile terminal is enabled to perform an operation in the method according to any aspect of the first aspect, the third aspect, the fourth aspect, and the ninth aspect of this application.

A seventeenth aspect of this application provides a computer program product, applied to a base station. The computer program product includes an instruction, and when the instruction is executed by a computing apparatus, the base station is enabled to perform an operation in the method according to the second aspect of this application.

An eighteenth aspect of this application provides a communications system. The communications system includes a mobile terminal and a base station. The mobile terminal is configured to perform the method according to any aspect of the first aspect, the third aspect, the fourth aspect, and the ninth aspect of this application. The base station is configured to perform the method according to the second aspect of this application.

According to the multi-air-interface communication method and the apparatus provided in this application, the mobile terminal supports a plurality of types of air interfaces, and the method resolves a BSR sending problem, a PHR reporting problem, and a DRX problem in a case of a plurality of air interfaces. The method that resolves the BSR sending problem in the case of the plurality of air interfaces enables the base station to more accurately allocate a radio resource to the mobile terminal based on a BSR sent on each air interface by the mobile terminal. The method that resolves the PHR reporting problem in the case of the plurality of air interfaces enables the base station to more accurately allocate the radio resource to the mobile terminal. The method that resolves the DRX problem in the case of the plurality of air interfaces is more beneficial to power saving of the mobile terminal.

DESCRIPTION OF EMBODIMENTS

An existing communications system supports only single-air-interface communication. With an increase of diversified service requirements, a single-air-interface communications system already cannot satisfy a QoS requirement of a service. Based on this, this application provides a multi-air-interface communication method. In the method of this embodiment, a mobile terminal supports at least two types of air interfaces, and the mobile terminal communicates with a base station by using a plurality of types of air interfaces. In a scenario, a cell supports at least two types of air interfaces, and a mobile terminal may communicate with a same cell by using a plurality of types of air interfaces. For example, in a 5G system, a cell supports at least two types of air interfaces at the same time. In another scenario, a mobile terminal performs carrier aggregation communication with a plurality of cells by using a plurality of types of air interfaces, and the cells that perform carrier aggregation support different air interfaces. In still another scenario, a mobile terminal performs dual-connectivity communication or multi-connectivity communication with a plurality of cells by using a plurality of types of air interfaces, and the plurality of cells that perform dual-connectivity communication or multi-connectivity communication support different air interfaces.

Because the mobile terminal supports the at least two types of air interfaces, corresponding buffer status report (BSR), power headroom report (PHR), and discontinuous reception (DRX) solutions are required.

Figure 1:
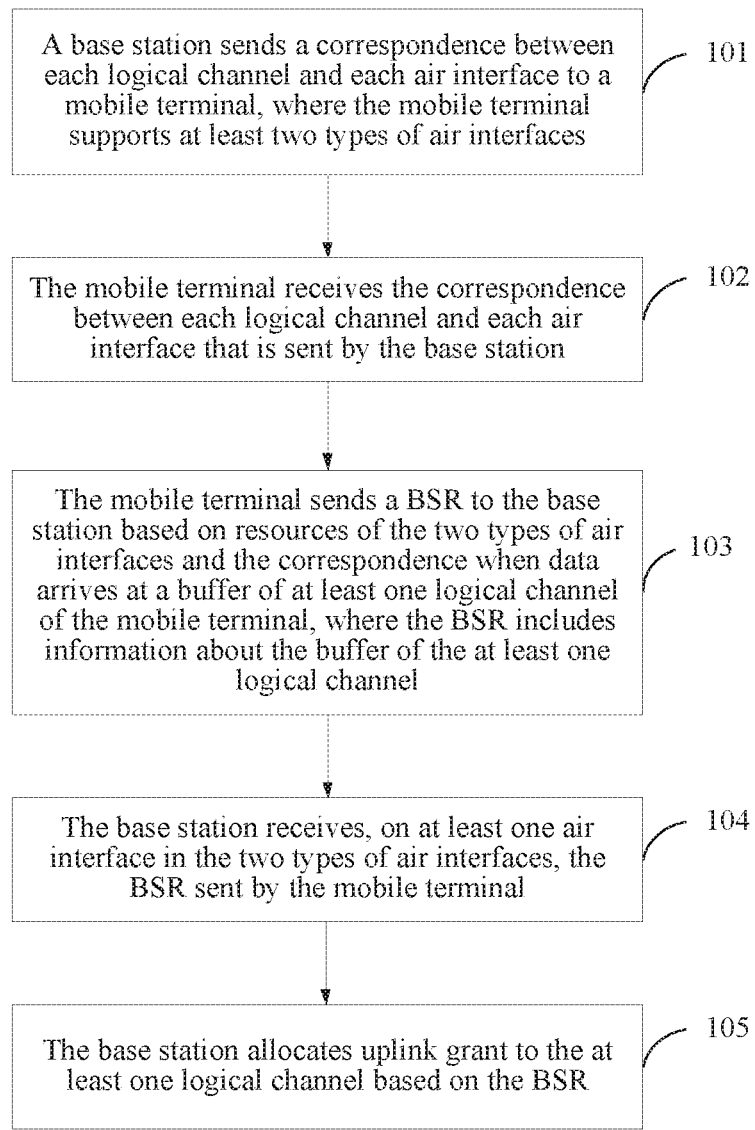
FIG. 1 is a flowchart of a multi-air-interface communication method according to Embodiment 1 of this application.

FIG. 1 is a flowchart of a multi-air-interface communication method according to Embodiment 1 of this application. As shown in FIG. 1, the method provided in this embodiment includes the following steps.

Step 101: A base station sends a correspondence between each logical channel and each air interface to a mobile terminal, where the mobile terminal supports at least two types of air interfaces.

Step 102: The mobile terminal receives the correspondence between each logical channel and each air interface that is sent by the base station.

In this embodiment, the mobile terminal supports the at least two types of air interfaces, and each type of air interface has a different physical-layer frame structure. For example, the mobile terminal supports a first air interface and a second air interface, a frame length of the first air interface is different from a frame length of the second air interface, and the frame length of the first air interface may be greater than or equal to the frame length of the second air interface. For example, the frame length of the first air interface is 1 millisecond (ms), and the frame length of the second air interface is 0.2 millisecond.

In the prior art, a mobile terminal supports only one type of air interface. Therefore, when data arrives at a buffer of any logical channel (LCH), if there is an uplink resource on an air interface, the mobile terminal sends a BSR to a base station by using the uplink resource of the air interface, and the base station schedules the mobile terminal based on the BSR. In this embodiment, the mobile terminal supports the plurality of air interfaces. Logical channels corresponding to different air interfaces may be different.

The base station may send the correspondence between each logical channel and each air interface to the mobile terminal by using Radio Resource Control (RRC) configuration. The correspondence includes an identifier of each logical channel and an air interface corresponding to each logical channel. The correspondence may alternatively be a mapping relationship between logical channel groups and air interfaces. One logical channel group includes at least one logical channel. Logical channels in a logical channel group correspond to a same air interface.

Figure 2:
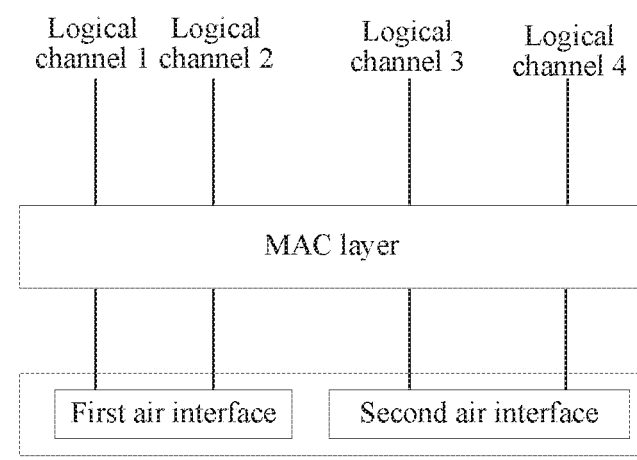
FIG. 2 is a schematic diagram of a correspondence between a logical channel and an air interface.
Figure 2:
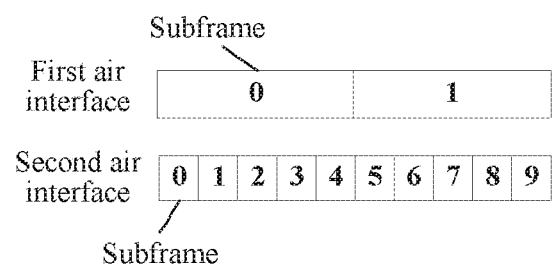

FIG. 2 is a schematic diagram of a correspondence between a logical channel and an air interface. As shown in FIG. 2, a mobile terminal has a total of four logical channels: a logical channel 1, a logical channel 2, a logical channel 3, and a logical channel 4. The mobile terminal has a total of four air interfaces: a first air interface and a second air interface. A subframe length of the first air interface is greater than a subframe length of the second air interface. The logical channel 1 and the logical channel 2 are mapped to the first air interface, and the logical channel 3 and the logical channel 4 are mapped to the second air interface. It should be noted that, there is further a sequence of priorities for the logical channels. In the example shown in FIG. 2, the sequence of priorities for the logical channels in descending order is: the logical channel 3, the logical channel 4, the logical channel 1, and the logical channel 2.

Step 103: The mobile terminal sends a BSR to the base station based on resources of the two types of air interfaces and the correspondence when data arrives at a buffer of at least one logical channel of the mobile terminal, where the BSR includes information about the buffer of the at least one logical channel.

In this embodiment, that the data arrives at the buffer of the logical channel includes that there is new data on a Packet Data Convergence Protocol (PDCP) layer or a Radio Link Control (RLC) layer. The at least one logical channel includes a first-type logical channel and/or a second-type logical channel, an air interface corresponding to the first-type logical channel is a first air interface, and an air interface corresponding to the second-type logical channel is a second air interface. A subframe length of the first air interface is greater than a subframe length of the second air interface. In the example shown in FIG. 2, the logical channel 1 and the logical channel 2 are first-type logical channels, and the logical channel 3 and the logical channel 4 are second-type logical channels. In this embodiment, when the data arrives at the buffer of the at least one logical channel, a MAC layer of the mobile terminal performs mapping from a logical channel to an air interface, and sends the BSR to the base station based on the resource of the air interfaces.

When the at least one logical channel includes the first-type logical channel and the second-type logical channel, that the mobile terminal sends a BSR to the base station based on resources of the two types of air interfaces and the correspondence is specifically:

the mobile terminal first determines, based on the correspondence, that an air interface corresponding to the first-type logical channel is a first air interface, and determines that an air interface corresponding to the second-type logical channel is a second air interface.

The first-type logical channel may include one or more logical channels. An air interface of each logical channel included in the first-type logical channel is a first air interface. The second-type logical channel may also include one or more logical channels. An air interface of each logical channel included in the second-type logical channel is a second air interface. After determining the air interface corresponding to each logical channel, the mobile terminal determines whether the second air interface and the first air interface have an available uplink resource for sending a BSR of the first-type logical channel and a BSR of the second-type logical channel.

(1) When the second air interface has the available uplink resource for sending the BSR of the first-type logical channel and the BSR of the second-type logical channel, the mobile terminal triggers the BSRs. In an implementation, the mobile terminal sends the BSR of the first-type logical channel and the BSR of the second-type logical channel by using an uplink resource of the second air interface. In another implementation, the mobile terminal sends the BSR of the second-type logical channel to the base station by using an uplink resource of the second air interface, and sends the BSR of the first-type logical channel to the base station by using an uplink resource of the first air interface.

(2) When the second air interface does not have the available uplink resource for sending the BSR of the first-type logical channel and the BSR of the second-type logical channel, the mobile terminal sends a scheduling request (SR) to the base station through the second air interface. For example, the mobile terminal triggers, in a subframe 0 corresponding to the second air interface, a BSR. However, there is no uplink resource in subframes 0 to 3 of the second air interface, and therefore the mobile terminal triggers an SR, and sends the SR to the base station. The mobile terminal may send the SR to the base station through a PUCCH corresponding to the second air interface. If the first air interface has an uplink resource, the mobile terminal may alternatively send the SR to the base station through a PUCCH corresponding to the first air interface. The base station allocates an uplink resource to the mobile terminal based on the SR, and sends uplink grant to the mobile terminal. The uplink grant sent by the base station may include uplink grant of the second air interface and/or uplink grant of the first air interface. When the uplink grant sent by the base station includes the uplink grant of the second air interface, the mobile terminal receives the uplink grant that is of the second air interface and that is sent by the base station based on the SR, and sends the BSR of the first-type logical channel and the BSR of the second-type logical channel to the base station by using an uplink resource granted to the second air interface; or the mobile terminal sends the BSR of the second-type logical channel to the base station by using an uplink resource granted to the second air interface, and sends the BSR of the first-type logical channel to the base station by using the uplink resource of the first air interface.

(3) When an uplink resource of the second air interface is sufficient for sending only some BSRs in the BSR of the first-type logical channel and the BSR of the second-type logical channel, the mobile terminal sends, based on priorities of the logical channels, a BSR of a logical channel whose priority is relatively high to the base station by using the uplink resource of the second air interface; or the mobile terminal sends the BSR of the second-type logical channel to the base station by using the uplink resource of the second air interface. For example, in the example shown in FIG. 2, when uplink data is to be sent on the logical channel 3, the logical channel 4, the logical channel 1, and the logical channel 2, because a priority of the logical channel 3 is the highest, the mobile terminal first sends, on the second air interface, a BSR of the logical channel 3. If there is a remaining resource on the second air interface, the mobile terminal successively sends BSRs of the logical channel 4, the logical channel 1, and the logical channel 2.

When the uplink resource of the second air interface is insufficient, but the first air interface has the available uplink resource, the mobile terminal send a BSR of a remaining logical channel by using an uplink resource of the first air interface. The remaining logical channel is a logical channel, in the at least one logical channel, other than a logical channel sent on the second air interface. After the mobile terminal sends the BSRs on the second air interface, the base station allocates an uplink resource to the mobile terminal based on the BSRs. By using the uplink resource allocated by the base station, the mobile terminal can not only send the uplink data, but also can send the BSR of the remaining logical channel. Therefore, when there is no uplink resource on the first air interface, the mobile terminal sends the BSR of the remaining logical channel to the base station by using the uplink resource allocated by the base station based on the BSRs sent on the second air interface.

(4) When both the second air interface and the first air interface have the available uplink resource for sending the BSR of the first-type logical channel and the BSR of the second-type logical channel, the mobile terminal sends the BSR of the second-type logical channel to the base station by using an uplink resource of the second air interface, and sends the BSR of the first-type logical channel to the base station by using an uplink resource of the first air interface.

When the second air interface does not have the available uplink resource and the first air interface has the available uplink resource, the mobile terminal requests the base station to allocate an uplink resource to the second air interface, sends the BSR of the second logical channel to the base station by using the uplink resource of the second air interface that is allocated by the base station, and sends the BSR of the first-type logical channel to the base station by using an uplink resource of the first air interface.

When the first air interface does not have the available uplink resource and the second air interface has the available uplink resource, the mobile terminal requests the base station to allocate an uplink resource to the first air interface, sends the BSR of the first logical channel to the base station by using the uplink resource of the first air interface that is allocated by the base station, and sends the BSR of the second logical channel to the base station by using an uplink resource of the second air interface.

When the at least one logical channel includes only the first-type logical channel, that the mobile terminal sends a BSR to the base station based on resources of the two types of air interfaces and the correspondence is specifically: the mobile terminal first determines, based on the correspondence, that the air interface corresponding to the first-type logical channel is the first air interface, and determines whether the first air interface has an available uplink resource for sending the BSR of the first-type logical channel; and when the first air interface has the available uplink resource, the mobile terminal sends the BSR of the first-type logical channel by using the available uplink resource of the first air interface; or when the first air interface does not have the available uplink resource, the mobile terminal sends an SR to the base station through the first air interface, receives uplink grant that is of the first air interface and that is sent by the base station based on the SR, and sends the BSR of the first-type logical channel to the mobile terminal by using an uplink resource granted to the first air interface.

When the at least one logical channel includes only the second-type logical channel, that the mobile terminal sends a BSR to the base station based on resources of the two types of air interfaces and the correspondence is specifically: the mobile terminal first determines, based on the correspondence, that the air interface corresponding to the second-type logical channel is the second air interface, and determines whether the second air interface has an available uplink resource for sending the BSR of the second-type logical channel; and when the second air interface has the available uplink resource, the mobile terminal sends the BSR of the second-type logical channel by using the available uplink resource of the second air interface; or when the second air interface does not have the available uplink resource, the mobile terminal sends a scheduling request to the base station through the second air interface, receives uplink grant that is of the second air interface and that is sent by the base station based on the scheduling request, and sends the BSR of the second-type logical channel to the mobile terminal by using an uplink resource granted to the second air interface.

In the foregoing example, the subframe length of the first air interface is greater than the subframe length of the second air interface, and subframes with different lengths have different delays. In this embodiment, a delay of a subframe of the second air interface is shorter than a delay of a subframe of the first air interface. Therefore, a delay requirement can be satisfied only when the BSR of the second-type logical channel is sent on the second air interface. The requirement cannot be satisfied if the BSR of the second-type logical channel is sent on the first air interface. However, the BSR of the first-type logical channel does not have a high requirement on the delay, and therefore the BSR of the first-type logical channel may be sent on the first air interface or the second air interface.

Step 104: The base station receives, on at least one air interface in the two types of air interfaces, the BSR sent by the mobile terminal.

Step 105: The base station allocates uplink grant to the at least one logical channel based on the BSR.

After allocating the uplink grant to the mobile terminal, the base station sends the uplink grant to the mobile terminal. The mobile terminal receives the uplink grant allocated by the base station based on the BSR. When the uplink grant includes uplink grant of the first air interface and uplink grant of the second air interface, the mobile terminal allocates, based on a priority of a logical channel corresponding to each air interface, an uplink resource to the logical channel corresponding to the air interface, specifically: the mobile terminal determines, based on a pre-obtained correspondence between each logical channel and each air interface, a logical channel corresponding to the first air interface and a logical channel corresponding to the second air interface, and allocates, based on priorities of the logical channel corresponding to the first air interface and the logical channel corresponding to the second air interface, a resource of the uplink grant of the first air interface and a resource of the uplink grant of the second air interface to the logical channel corresponding to the first air interface and the logical channel corresponding to the second air interface.

For example, the mobile terminal allocates an uplink resource to each logical channel based on the priorities of the logical channels corresponding to the air interfaces and a prioritized bit rate (PBR). Specifically: for logical channels corresponding to an air interface, the mobile terminal first allocates an uplink resource to a logical channel whose priority is the highest and that has a token quantity greater than 0 in a token bucket (token bucket), to satisfy a PBR requirement of this logical channel whose priority is the highest. If there is still a remaining resource, the mobile terminal further allocates an uplink resource to a logical channel whose priority is the second highest and that has a token quantity greater than 0 in the token bucket. The rest can be deduced by analogy, until all resources of the uplink grant of the air interface are allocated. After a PBR of each logical channel (corresponding to a logical channel that has a token quantity greater than 0 in the token bucket) corresponding to the air interface is satisfied, if there is still a remaining resource in the uplink grant of the air interface, the remaining resource is successively allocated in descending order of the priorities of the logical channels.

The logical channels corresponding to the first air interface and the second air interface are allowed to use uplink grant of another air interface. For example, when data of logical channels corresponding to the first air interface may all be sent and there is still a remaining resource in the uplink grant of the first air interface, the remaining resource may be used for sending data of the logical channel corresponding to the second air interface, and vice versa. Specifically, resource allocation may be performed in the following two manners: Manner 1: The mobile terminal allocates, based on the priority of the logical channel corresponding to the first air interface, the resource of the uplink grant of the first air interface and/or the resource of the uplink grant of the second air interface to the logical channel corresponding to the first air interface; and when there is a remaining resource in the resource of the uplink grant of the first air interface and/or the resource of the uplink grant of the second air interface, the mobile terminal allocates, based on the priority of the logical channel corresponding to the second air interface, the remaining resource to the logical channel corresponding to the second air interface. Manner 2: The mobile terminal allocates, based on the priority of the logical channel corresponding to the second air interface, the resource of the uplink grant of the second air interface and/or the resource of the uplink grant of the first air interface to the logical channel corresponding to the second air interface, and when there is a remaining resource in the resource of the uplink grant of the second air interface and/or the resource of the uplink grant of the first air interface, the mobile terminal allocates, based on the priority of the logical channel corresponding to the first air interface, the remaining resource to the logical channel corresponding to the first air interface.

Alternatively, one or more logical channels whose priorities are the highest are allowed to use uplink grant of any air interface in the plurality of types of air interfaces. For example, for a logical channel whose priority is high and that is corresponding to the second air interface, when the uplink grant of the second air interface is insufficient for sending all data in a buffer of the logical channel or cannot satisfy a PBR of the logical channel, the uplink grant of the first air interface may be used.

Alternatively, one or more logical channels whose priorities are the highest or the lowest are allowed to be mapped to any air interface in an unfixed manner, and only an air interface that is preferentially used by the one or more logical channels is configured. Then, these logical channels may use uplink grant of any air interface according to a rule.

For example, the rule may be: uplink grant of any air interface is preferentially allocated to the logical channels whose priorities are the highest; or for any air interface, a remaining resource of uplink grant of the air interface may be allocated to the logical channels whose priorities are the lowest, only when a PBR of a logical channel corresponding to the air interface is satisfied.

In this embodiment, the mobile terminal receives the correspondence between each logical channel and each air interface that is sent by the base station. The mobile terminal supports the at least two types of air interfaces. The mobile terminal sends the BSR to the base station based on the resources of the two types of air interfaces and the correspondence when the data arrives at the buffer of the at least one logical channel of the mobile terminal. A BSR sending problem in a case of a plurality of air interfaces is resolved, and the base station is enabled to more accurately allocate a radio resource to the mobile terminal based on a BSR sent on each air interface by the mobile terminal.

Figure 3:
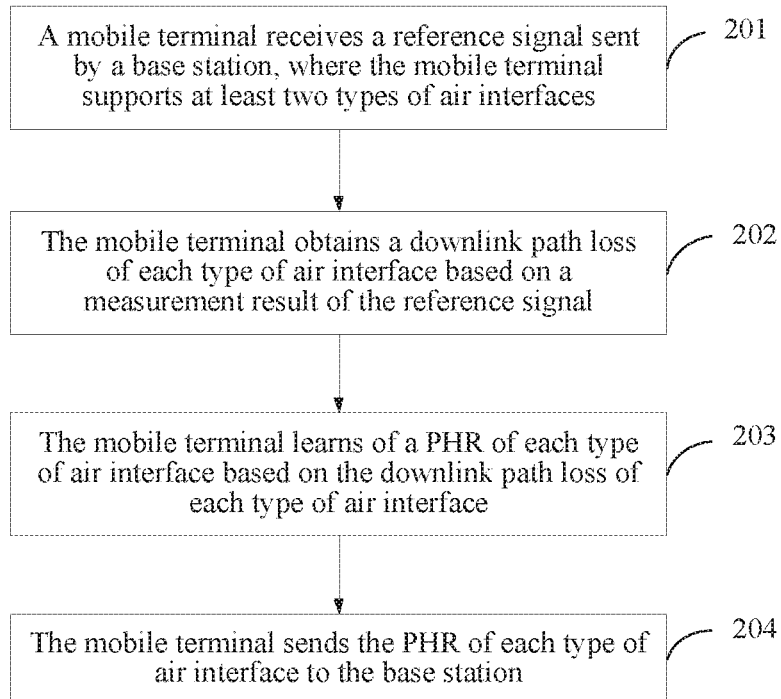
FIG. 3 is a flowchart of a multi-air-interface communication method according to Embodiment 2 of this application.

FIG. 3 is a flowchart of a multi-air-interface communication method according to Embodiment 2 of this application. As shown in FIG. 3, the method provided in this embodiment includes the following steps.

Step 201: A mobile terminal receives a reference signal sent by a base station, where the mobile terminal supports at least two types of air interfaces.

Step 202: The mobile terminal obtains a downlink path loss of each type of air interface based on a measurement result of the reference signal.

In a first implementation, the base station sends a reference signal on a first air interface, and the mobile terminal receives the reference signal sent on the first air interface by the base station, and then estimates a downlink path loss of the first air interface based on a measurement result of the reference signal received on the first air interface. The downlink path loss of the first air interface is used as a downlink path loss of each air interface. This implementation is applicable to a case in which a path loss difference between air interfaces is not large. Usually, a path loss difference between sub-bands in a cell is not large. How to determine the downlink path loss based on the measurement result of the reference signal is the prior art, and details are not described herein. The first air interface is pre-configured for the mobile terminal by the base station. The first air interface is also referred to as a public air interface. The public air interface is different from the at least two types of air interfaces supported by the mobile terminal. The public air interface is specially used by the base station to send the reference signal, so that the mobile terminal calculates the downlink path loss.

In a second implementation, the base station separately sends a reference signal on each type of air interface in the at least two types of air interfaces supported by the mobile terminal, and the mobile terminal receives the reference signal sent on each air interface by the base station, and determines a downlink path loss of each air interface based on a measurement result of the reference signal received on each air interface.

A difference between a third implementation and the first implementation is that, the first air interface is any air interface in the at least two types of air interfaces supported by the mobile terminal.

Step 203: The mobile terminal learns of a PHR of each type of air interface based on the downlink path loss of each type of air interface.

Step 204: The mobile terminal sends the PHR of each type of air interface to the base station.

When the mobile terminal calculates downlink path losses of the air interfaces by using the first implementation, because the base station may send a reference signal only in some subframes and no corresponding uplink resource is allocated to the public air interface, the mobile terminal does not send a PHR on the public air interface, and can send a PHR on only an air interface supported by the mobile terminal. PH calculation is performed based on an uplink resource of an uplink frequency corresponding to a reference frequency range of a downlink path loss. The reference frequency range of the downlink path loss is a frequency range in which a downlink reference signal used by the mobile terminal to calculate an uplink path loss is located. For the mobile terminal, the mobile terminal can obtain the uplink path loss based on only a measurement of a downlink signal. If an air interface corresponding to the reference frequency range of the downlink path loss does not have an uplink resource, the PH calculation is performed by using virtual PH.

When the mobile terminal calculates downlink path losses of the air interfaces by using the second implementation, because an air interface corresponding to the reference frequency range of the downlink path loss has an uplink resource, PH of each air interface is real PH.

When the mobile terminal calculates downlink path losses of the air interfaces by using the second implementation, the mobile terminal determines, based on whether a PHR is sent by using an uplink resource of an air interface corresponding to the reference frequency range of the downlink path loss, whether virtual PH is used in PH calculation. For example, the mobile terminal supports the first air interface and a second air interface, the base station sends the reference signal on the first air interface, and the mobile terminal determines the downlink path loss based on the measurement result of the reference signal received on the first air interface. If the mobile terminal sends the PHR to the base station on the first air interface, PH of the first air interface is real PH, and PH of the second air interface is virtual PH.

When the PH of each air interface is calculated, the PH of the air interface needs to be calculated based on a maximum power Pcmax,c of a cell. In an implementation, all air interfaces in a cell always use a same Pcmax,c maximum value, and the mobile terminal calculates an actual cell maximum power of the air interfaces based on a resource allocation status of the air interfaces and the Pcmax,c maximum value. In another implementation, different air interfaces configured for a cell by the base station use different Pcmax,c maximum values, and the mobile terminal calculates actual cell maximum powers of the air interfaces based on a resource allocation status of the air interfaces and the Pcmax,c maximum values of the air interfaces. In another implementation, the base station configures a Pcmax,c maximum value for the mobile terminal, and the mobile terminal determines Pcmax,c maximum values of air interfaces based on sub-band widths occupied by the air interfaces and the Pcmax,c maximum value configured by the base station, and separately determines an actual cell maximum power of each air interface based on an allocation status of resources and the determined Pcmax,c maximum values of the air interfaces.

In this embodiment, the mobile terminal receives the reference signal sent by the base station. The mobile terminal supports the at least two types of air interfaces. The mobile terminal learns of the downlink path loss of each type of air interface based on the measurement result of the reference signal, obtains the PHR of each type of air interface based on the downlink path loss of each type of air interface, and sends the PHR of each type of air interface to the base station. Flexible calculation and reporting of a PHR by the mobile terminal in a case of a plurality of air interfaces are resolved, so that the base station can more accurately allocate a radio resource to the mobile terminal.

Figure 4:
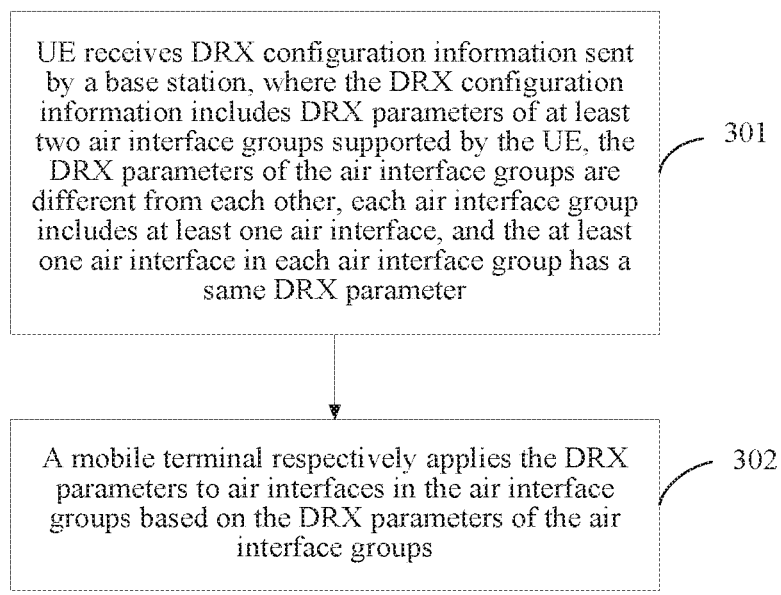
FIG. 4 is a flowchart of a multi-air-interface communication method according to Embodiment 3 of this application.

FIG. 4 is a flowchart of a multi-air-interface communication method according to Embodiment 3 of this application. As shown in FIG. 4, the method provided in this embodiment includes the following steps:

Step 301: A mobile terminal receives DRX configuration information sent by a base station, where the DRX configuration information includes DRX parameters of at least two air interface groups supported by the mobile terminal, where the DRX parameters of the air interface groups are different from each other, each air interface group includes at least one air interface, and the at least one air interface in each air interface group has a same DRX parameter.

Step 302: The mobile terminal respectively applies the DRX parameters to air interfaces in the air interface groups based on the DRX parameters of the air interface groups.

When a cell supports a plurality of types of air interfaces, if the mobile terminal complies, on the air interfaces, with a consistent DRX operation, it is not beneficial to power saving of the mobile terminal. For example, when the mobile terminal does not have a requirement for data transmission on the first air interface, the mobile terminal may originally enter an inactive state on the first air interface to reduce battery consumption. However, if the mobile terminal further needs to transmit data with the base station on the second air interface, the mobile terminal also needs to be kept in the inactive state on the first air interface. To reduce energy consumption of the mobile terminal to the greatest extent, in this embodiment, the base station sets different DRX parameters for different air interface groups, and each air interface may perform a DRX operation based on a DRX parameter that is configured for the air interface by the base station, namely, the DRX operation of each air interface is mutually independent.

The DRX parameters include but are not limited to at least one or more of the following parameters: an on duration timer (on duration timer), an inactivity timer (inactivity timer), and a hybrid automatic repeat request round trip time (HARQ RTT) timer. Optionally, on duration timers of the air interface groups have a same timing time.

In this embodiment, the mobile terminal receives the DRX configuration information sent by the base station, where the DRX configuration information includes the DRX parameters of the at least two air interface groups supported by the mobile terminal, where the DRX parameters of the air interface groups are different from each other, each air interface group includes the at least one air interface, the at least one air interface in each air interface group has the same DRX parameter, and the mobile terminal respectively applies the DRX parameters to the air interfaces in the air interface groups based on the DRX parameters of the air interface groups. The DRX operation of each air interface is independently performed, and therefore it is beneficial to the power saving of the mobile terminal.

Figure 5:
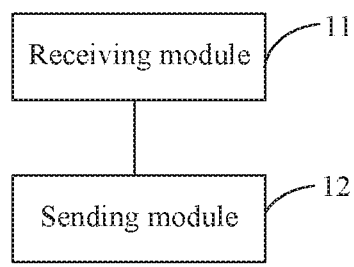
FIG. 5 is a schematic structural diagram of a mobile terminal according to Embodiment 4 of this application.

FIG. 5 is a schematic structural diagram of a mobile terminal according to Embodiment 4 of this application. As shown in FIG. 5, the mobile terminal provided in this embodiment includes: a receiving module 11 and a sending module 12.

The receiving module 11 is configured to receive a correspondence between each logical channel and each air interface that is sent by a base station, where the mobile terminal supports at least two types of air interfaces.

The sending module 12 is configured to send a buffer status report BSR to a base station based on resources of the two types of air interfaces and the correspondence when data arrives at a buffer of at least one logical channel of the mobile terminal, where the BSR includes information about the buffer of the at least one logical channel.

Optionally, the at least one logical channel includes a first-type logical channel and/or a second-type logical channel, an air interface corresponding to the first-type logical channel is a first air interface, and an air interface corresponding to the second-type logical channel is a second air interface. A subframe length of the first air interface is greater than a subframe length of the second air interface.

Figure 6:
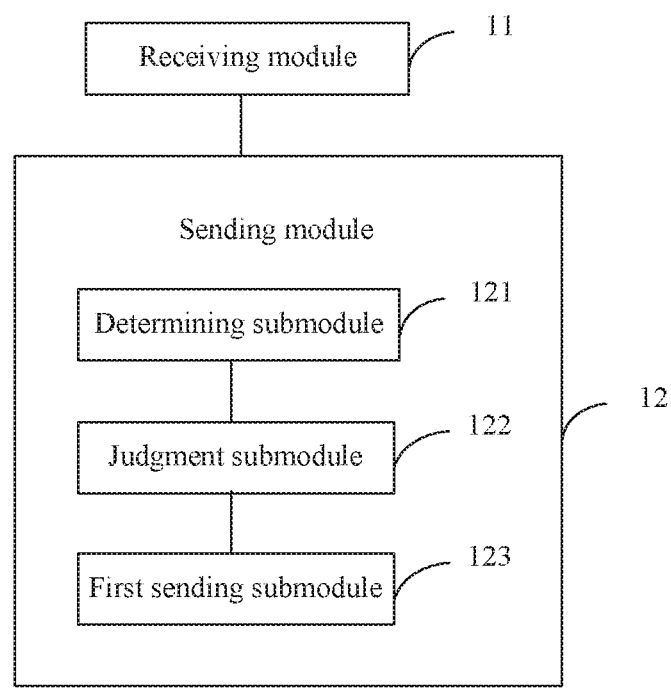
FIG. 6 is a schematic structural diagram of a mobile terminal according to Embodiment 5 of this application.

FIG. 6 is a schematic structural diagram of a mobile terminal according to Embodiment 5 of this application. Based on the mobile terminal shown in FIG. 5, the sending module 12 in this embodiment includes: a determining submodule 121, a judgment submodule 122, and a first sending submodule 123.

In this embodiment, the at least one logical channel includes the first-type logical channel and the second-type logical channel.

The determining submodule 121 is configured to determine, based on the correspondence, that the air interface corresponding to the first-type logical channel is the first air interface and the air interface corresponding to the second-type logical channel is the second air interface.

The judgment submodule 122 is configured to determine whether the second air interface and the first air interface have an available uplink resource for sending a BSR of the first-type logical channel and a BSR of the second-type logical channel.

The first sending submodule 123 is configured to:
when the second air interface has the available uplink resource for sending the BSR of the first-type logical channel and the BSR of the second-type logical channel, send the BSR of the first-type logical channel and the BSR of the second-type logical channel to the base station by using an uplink resource of the second air interface; or
send the BSR of the second-type logical channel to the base station by using an uplink resource of the second air interface, and send the BSR of the first-type logical channel to the base station by using an uplink resource of the first air interface.

Figure 7:
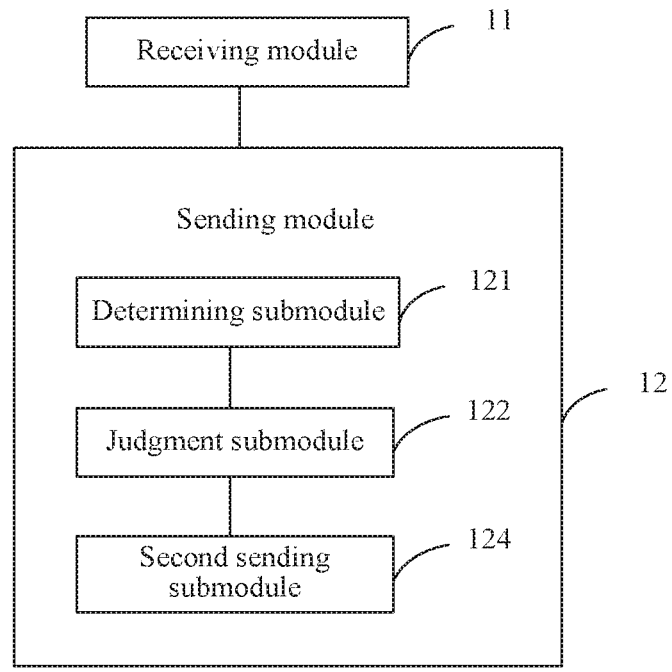
FIG. 7 is a schematic structural diagram of a mobile terminal according to Embodiment 6 of this application.

FIG. 7 is a schematic structural diagram of a mobile terminal according to Embodiment 6 of this application. Based on the mobile terminal shown in FIG. 5, the sending module 12 in this embodiment includes: a determining submodule 121, a judgment submodule 122, and a second sending submodule 124.

In this embodiment, the at least one logical channel includes the first-type logical channel and the second-type logical channel.

The determining submodule 121 is configured to determine, based on the correspondence, that the air interface corresponding to the first-type logical channel is the first air interface and the air interface corresponding to the second-type logical channel is the second air interface.

The judgment submodule 122 is configured to determine whether the second air interface and the first air interface have an available uplink resource for sending a BSR of the first-type logical channel and a BSR of the second-type logical channel.

The second sending submodule 124 is configured to:
when the second air interface does not have the available uplink resource for sending the BSR of the first-type logical channel and the BSR of the second-type logical channel, send a scheduling request to the base station through the second air interface.

The receiving module 11 is further configured to receive uplink grant for the second air interface that is sent by the base station to the mobile terminal based on the scheduling request.

Correspondingly, the second sending submodule 127 is further configured to send the BSR of the first-type logical channel and the BSR of the second-type logical channel to the base station by using an uplink resource granted to the second air interface; or send the BSR of the second-type logical channel to the base station by using an uplink resource granted to the second air interface, and send the BSR of the first-type logical channel to the base station by using an uplink resource of the first air interface.

Figure 8:
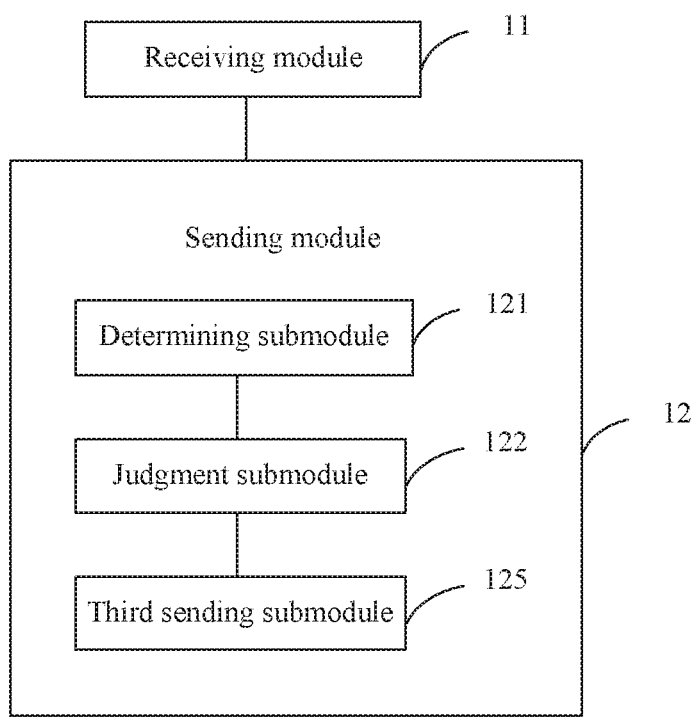
FIG. 8 is a schematic structural diagram of a mobile terminal according to Embodiment 7 of this application.

FIG. 8 is a schematic structural diagram of a mobile terminal according to Embodiment 7 of this application. Based on the mobile terminal shown in FIG. 5, the sending module 12 in this embodiment includes: a determining submodule 121, a judgment submodule 122, and a third sending submodule 125.

In this embodiment, the at least one logical channel includes the first-type logical channel and the second-type logical channel.

The determining submodule 121 is configured to determine, based on the correspondence, that the air interface corresponding to the first-type logical channel is the first air interface and the air interface corresponding to the second-type logical channel is the second air interface.

The judgment submodule 122 is configured to determine whether the second air interface and the first air interface have an available uplink resource for sending a BSR of the first-type logical channel and a BSR of the second-type logical channel.

The third sending submodule 125 is configured to:
when an uplink resource of the second air interface is sufficient for sending only some BSRs in the BSR of the first-type logical channel and the BSR of the second-type logical channel, send a BSR of a logical channel whose priority is relatively high to the base station by using the uplink resource of the second air interface, or send the BSR of the second-type logical channel to the base station by using the uplink resource of the second air interface; or
when the first air interface has the available uplink resource, send a BSR of a remaining logical channel by using an uplink resource of the first air interface, where the remaining logical channel is a logical channel, in the at least one logical channel, other than a logical channel sent on the second air interface; or
when the first air interface does not have the available uplink resource, send a BSR of the remaining logical channel to the base station by using an uplink resource allocated by the base station based on a BSR sent on the second air interface.

Figure 9:
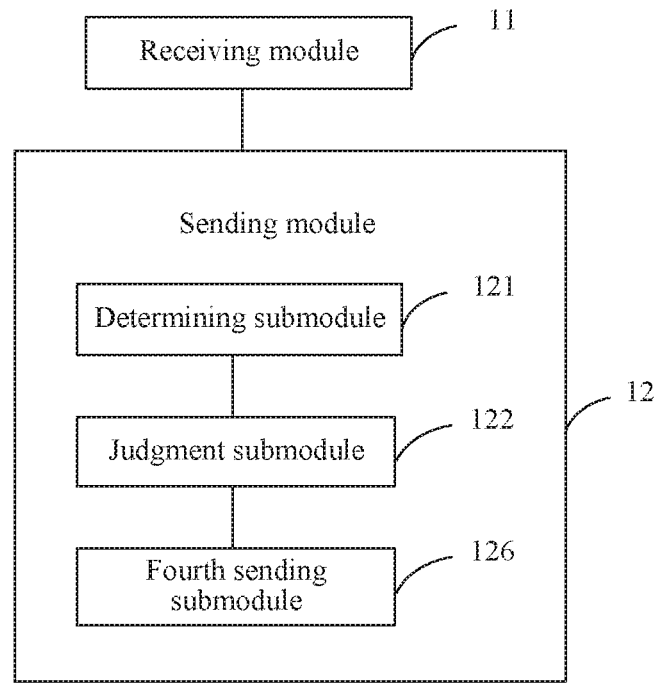
FIG. 9 is a schematic structural diagram of a mobile terminal according to Embodiment 8 of this application.

FIG. 9 is a schematic structural diagram of a mobile terminal according to Embodiment 8 of this application. Based on the mobile terminal shown in FIG. 5, the sending module 12 in this embodiment includes: a determining submodule 121, a judgment submodule 122, and a fourth sending submodule 126.

In this embodiment, the at least one logical channel includes the first-type logical channel and the second-type logical channel.

The determining submodule 121 is configured to determine, based on the correspondence, that the air interface corresponding to the first-type logical channel is the first air interface and the air interface corresponding to the second-type logical channel is the second air interface.

The judgment submodule 122 is configured to determine whether the second air interface and the first air interface have an available uplink resource for sending a BSR of the first-type logical channel and a BSR of the second-type logical channel.

The fourth sending submodule 126 is configured to:
when both the second air interface and the first air interface have the available uplink resource for sending the BSR of the first-type logical channel and the BSR of the second-type logical channel, send the BSR of the second-type logical channel to the base station through the second air interface, and send, by the mobile terminal, the BSR of the first-type logical channel to the base station by using an uplink resource of the first air interface, or
when the second air interface does not have the available uplink resource and the first air interface has the available uplink resource, request the base station to allocate an uplink resource to the second air interface, send the BSR of the second logical channel to the base station by using the uplink resource of the second air interface that is allocated by the base station, and send the BSR of the first-type logical channel to the base station by using an uplink resource of the first air interface; or
when the first air interface does not have the available uplink resource and the second air interface has the available uplink resource, request the base station to allocate an uplink resource to the first air interface, send the BSR of the first logical channel to the base station by using the uplink resource of the first air interface that is allocated by the base station, and send the BSR of the second logical channel to the base station by using an uplink resource of the second air interface.

Figure 10:
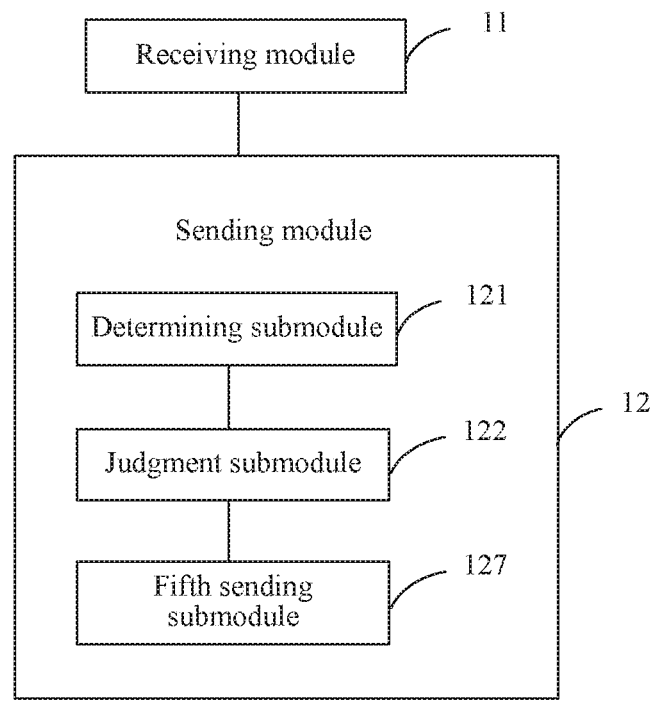
FIG. 10 is a schematic structural diagram of a mobile terminal according to Embodiment 9 of this application.

FIG. 10 is a schematic structural diagram of a mobile terminal according to Embodiment 9 of this application. Based on the mobile terminal shown in FIG. 5, the sending module 12 in this embodiment includes: a determining submodule 121, a judgment submodule 122, and a fifth sending submodule 127.

In this embodiment, the at least one logical channel includes only the first-type logical channel.

The determining submodule 121 is configured to determine, based on the correspondence, that the air interface corresponding to the first-type logical channel is the first air interface.

The judgment submodule 122 is configured to determine whether the first air interface has an available uplink resource for sending a BSR of the first-type logical channel.

The fifth sending submodule 127 is configured to:
when the first air interface has the available uplink resource, send the BSR of the first-type logical channel to the base station by using the available uplink resource of the first air interface; or
when the first air interface does not have the available uplink resource, send a scheduling request to the base station through the first air interface, and receive uplink grant for the first air interface that is sent by the base station based on the scheduling request; and
send the BSR of the first-type logical channel to the mobile terminal by using an uplink resource granted to the first air interface.

Figure 11:
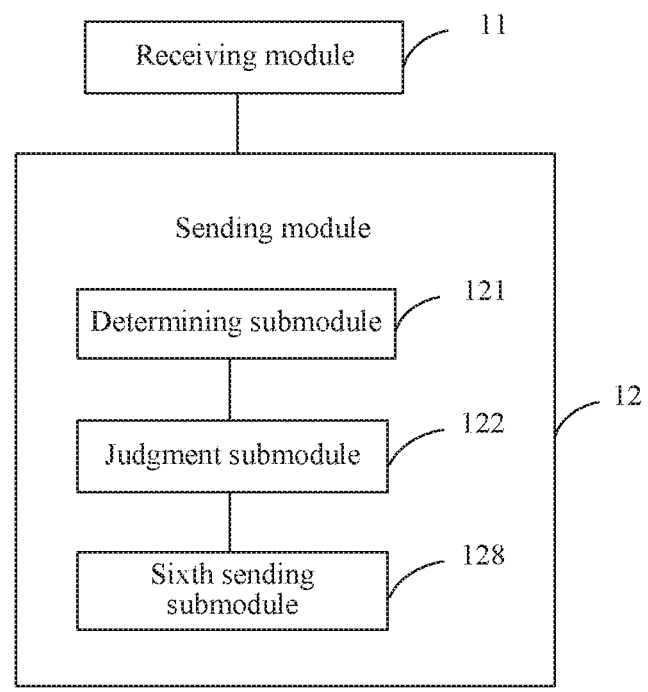
FIG. 11 is a schematic structural diagram of a mobile terminal according to Embodiment 10 of this application.

FIG. 11 is a schematic structural diagram of a mobile terminal according to Embodiment 10 of this application.

Based on the mobile terminal shown in FIG. 5, the sending module 12 in this embodiment includes: a determining submodule 121, a judgment submodule 122, and a sixth sending submodule 128.

In this embodiment, the at least one logical channel includes only the second-type logical channel.

The determining submodule 121 is configured to determine, based on the correspondence, that the air interface corresponding to the second-type logical channel is the second air interface.

The judgment submodule 122 is configured to determine whether the second air interface has an available uplink resource for sending a BSR of the second-type logical channel.

The sixth sending submodule 128 is configured to:
when the second air interface has the available uplink resource, send, by the mobile terminal, the BSR of the second-type logical channel to the base station by using the available uplink resource of the second air interface; or
when the second air interface does not have the available uplink resource, send, by the mobile terminal, a scheduling request to the base station through the second air interface, receive uplink grant for the second air interface that is sent by the base station based on the scheduling request, and send the BSR of the second-type logical channel to the mobile terminal by using an uplink resource granted to the second air interface.

The mobile terminals shown in FIG. 5 to FIG. 11 may be configured to perform the method in Embodiment 1. Specific implementations and technical effects are similar. Details are not described herein again.

Figure 12:
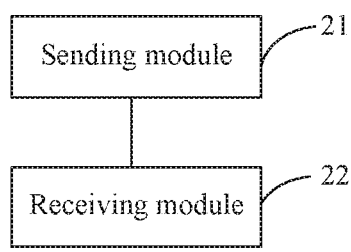
FIG. 12 is a schematic structural diagram of a base station according to Embodiment 11 of this application.

FIG. 12 is a schematic structural diagram of a base station according to Embodiment 11 of this application. As shown in FIG. 12, the base station provided in this embodiment includes: a sending module 21 and a receiving module 22.

The sending module 21 is configured to send a correspondence between each logical channel and each air interface to a mobile terminal, where the mobile terminal supports at least two types of air interfaces.

The receiving module 22 is configured to receive, on at least one air interface in the two types of air interfaces, a buffer status report BSR sent by the mobile terminal, where the BSR includes information about a buffer of the at least one logical channel.

The sending module 21 is further configured to allocate uplink grant to the at least one logical channel based on the BSR.

Optionally, the base station further includes an allocation module. The receiving module 22 is further configured to receive a scheduling request SR sent on the at least one type of air interface by the mobile terminal. The allocation module is configured to allocate uplink grant to an air interface of the SR received by the receiving module.

The base station in this embodiment may be configured to perform the method in Embodiment 1. Specific implementations and technical effects are similar. Details are not described herein again.

Figure 13:
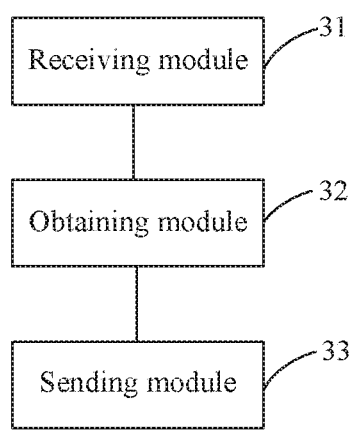
FIG. 13 is a schematic structural diagram of a mobile terminal according to Embodiment 12 of this application.

FIG. 13 is a schematic structural diagram of a mobile terminal according to Embodiment 12 of this application. As shown in FIG. 13, the mobile terminal provided in this embodiment includes: a receiving module 31, an obtaining module 32, and a sending module 33.

The receiving module 31 is configured to receive a reference signal sent by a base station. The mobile terminal supports at least two types of air interfaces.

The obtaining module 32 is configured to: learn of a downlink path loss of each type of air interface based on a measurement result of the reference signal, and learn of a PHR of the each type of air interface based on the downlink path loss of the each type of air interface.

The sending module 33 is configured to send the PHR of the each type of air interface to the base station.

Optionally, the receiving module 31 is specifically configured to receive the reference signal sent by the base station on a first air interface. Correspondingly, the obtaining module 32 is specifically configured to: estimate a downlink path loss of the first air interface based on the measurement result of the reference signal received on the first air interface, determine that the downlink path loss of the first air interface is the downlink path loss of the each type of air interface, calculate a PHR of the first air interface based on the downlink path loss of the first air interface, and determine that the PHR of the public air interface is a PHR of each air interface.

The first air interface is pre-configured for the mobile terminal by the base station, the first air interface is different from the at least two types of air interfaces supported by the mobile terminal, and the first air interface is used by the base station to send the reference signal, so that the mobile terminal calculates the downlink path loss. Alternatively, the first air interface is any type of air interface in the at least two types of air interfaces supported by the mobile terminal.

Optionally, the receiving module 31 is specifically configured to receive a reference signal separately sent by the base station on each type of air interface in the at least two types of air interfaces supported by the mobile terminal. Correspondingly, the obtaining module 32 is specifically configured to calculate a downlink path loss of each air interface based on a measurement result of the reference signal received on the each type of air interface.

The mobile terminal in this embodiment may be configured to perform the method in Embodiment 2. Specific implementations and technical effects are similar. Details are not described herein again.

Figure 14:
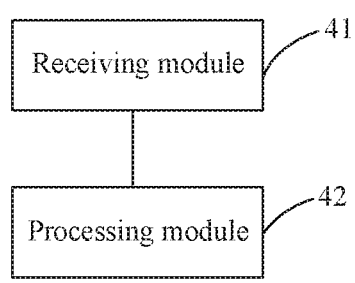
FIG. 14 is a schematic structural diagram of a mobile terminal according to Embodiment 13 of this application.

FIG. 14 is a schematic structural diagram of a mobile terminal according to Embodiment 13 of this application. As shown in FIG. 14, the mobile terminal provided in this embodiment includes: a receiving module 41 and a processing module 42.

The receiving module 41 is configured to receive DRX configuration information sent by a base station, where the DRX configuration information includes DRX parameters of at least two air interface groups supported by the mobile terminal, where the DRX parameters of the air interface groups are different from each other, each air interface group includes at least one air interface, and the at least one air interface in each air interface group has a same DRX parameter.

The processing module 42 is configured to respectively apply the DRX parameters to air interfaces in the air interface groups based on the DRX parameters of the air interface groups.

Optionally, the DRX parameters include at least one of the following information: an on duration timer, an inactivity timer, or a hybrid automatic repeat request round trip time timer.

Optionally, on duration timers of the air interface groups have a same timing time.

The mobile terminal in this embodiment may be configured to perform the method in Embodiment 3. Specific implementations and technical effects are similar. Details are not described herein again.

Figure 15:
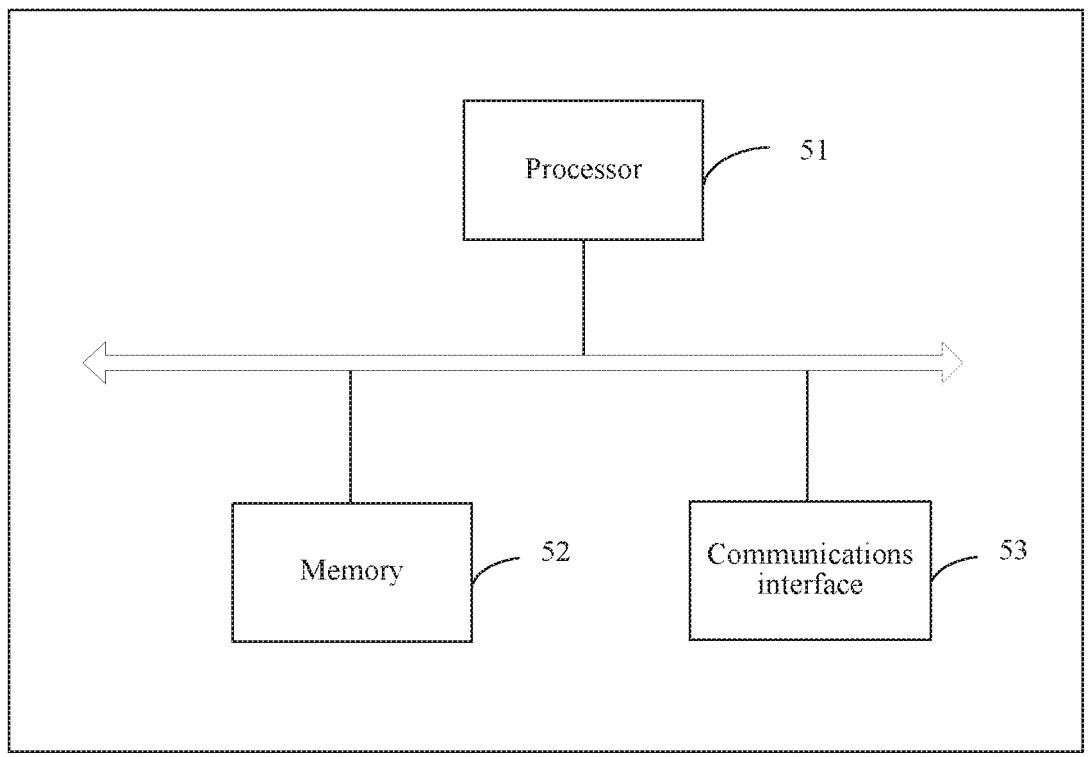
FIG. 15 is a schematic structural diagram of a mobile terminal according to Embodiment 14 of this application.

FIG. 15 is a schematic structural diagram of a mobile terminal according to Embodiment 14 of this application. As shown in FIG. 15, the mobile terminal provided in this embodiment includes: a processor 51, a memory 52, and a communications interface 53. The memory 52 and the communications interface 53 are connected to and communicate with the processor 51 by using a bus. The memory 52 is configured to store an instruction. The communications interface 53 is configured to communicate with another device. The processor 51 is configured to execute the instruction stored in the memory 52, to enable the mobile terminal to perform the method according to Embodiment 1 to Embodiment 3.

Figure 16:
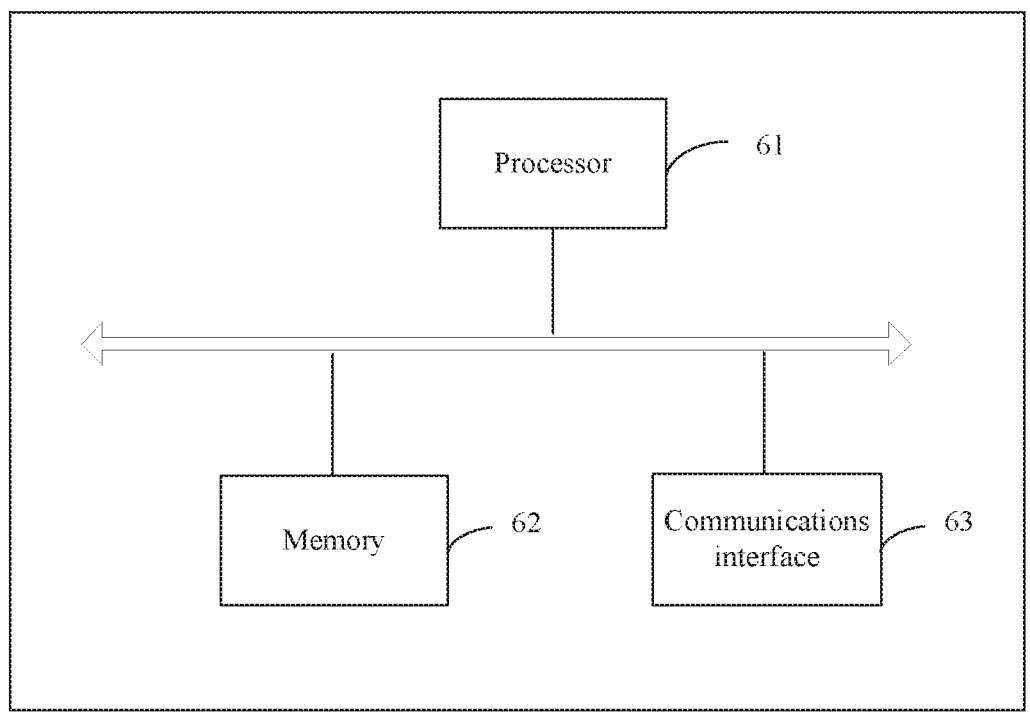
FIG. 16 is a schematic structural diagram of a base station according to Embodiment 15 of this application.

FIG. 16 is a schematic structural diagram of a base station according to Embodiment 15 of this application. As shown in FIG. 16, the base station provided in this embodiment includes: a processor 61, a memory 62, and a communications interface 63. The memory 62 and the communications interface 63 are connected to and communicate with the processor 61 by using a bus. The memory 62 is configured to store an instruction. The communications interface 63 is configured to communicate with another device. The processor 61 is configured to execute the instruction stored in the memory 56, to enable the base station to perform the method according to Embodiment 1.

Embodiment 16 of this application provides a computer readable storage medium. The computer readable storage medium stores an instruction. When the instruction is executed by a computing apparatus, the mobile terminal is enabled to perform an operation performed by the mobile terminal in the foregoing method embodiments.

Embodiment 17 of this application provides a computer readable storage medium. The computer readable storage medium stores an instruction. When the instruction is executed by a computing apparatus, the base station is enabled to perform an operation performed by the base station in the foregoing method embodiments.

Embodiment 18 of this application provides a chip system. The chip system is applied to a mobile terminal. The chip system includes: at least one communications interface, at least one processor, and at least one memory. The communications interface, the memory, and the processor are interconnected by using a bus. The at least one processor executes an instruction stored in the memory, to enable the mobile terminal to perform an operation performed by the mobile terminal in the foregoing method embodiments.

Embodiment 19 of this application provides a chip system. The chip system is applied to a base station. The chip system includes: at least one communications interface, at least one processor, and at least one memory. The communications interface, the memory, and the processor are interconnected by using a bus. The at least one processor executes an instruction stored in the memory, to enable the base station to perform an operation performed by the base station in the foregoing method embodiments.

Embodiment 20 of this application provides a communications system. The communications system includes a mobile terminal and a base station. The mobile terminal performs an operation performed by the mobile terminal in the foregoing method embodiments. The base station performs an operation performed by the base station in the foregoing method embodiments.

Embodiment 21 of this application provides a computer program product, applied to a mobile terminal. The computer program product includes an instruction, and when the instruction is executed by a computing apparatus, the mobile terminal is enabled to perform an operation performed by the mobile terminal in the foregoing method embodiments.

Embodiment 22 of this application provides a computer program product, applied to a base station. The computer program product includes an instruction, and when the instruction is executed by a computing apparatus, the base station is enabled to perform an operation performed by the base station in the foregoing method embodiments.

In the foregoing embodiments, the communications interface may be a transceiver. The transceiver has functions of data sending and data receiving. The transceiver may be implemented as an independent physical component, or may include a transmitter and a receiver.

It may be understood that, in this application, the processor used in the base stations or the mobile terminals may be a central processing unit (CPU), a general processor, a digital signal processor (DSP), an application-specific integrated circuit (ASIC), a field programmable gate array (FPGA), or another programmable logic device, a transistor logic device, a hardware device, or any combination thereof. The processor may implement or execute various examples of logical blocks, modules, and circuits described with reference to content disclosed in this application. Alternatively, the processor may be a combination of processors implementing a computing function, for example, a combination of one or more microprocessors, or a combination of the DSP and a microprocessor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For convenience of representation, the bus in the accompanying drawings of this application is not limited to only one bus or one type of bus.

In the several embodiments provided in this application, it should be understood that the disclosed apparatus and method may be implemented in other manners. For example, the described apparatus embodiment is merely an example. For example, the unit division is merely logical function division and may be other divisions during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A multi-air-interface communication method, comprising:
receiving, by a mobile terminal, a correspondence between each logical channel and each air interface that is sent by a base station, wherein the mobile terminal supports at least two types of air interfaces; and
sending, by the mobile terminal, a buffer status report (BSR) to a base station based on resources of the two types of air interfaces and the correspondence when data arrives at a buffer of at least one logical channel of the mobile terminal, wherein the BSR comprises information about the buffer of the at least one logical channel, wherein an air interface corresponding to a first-type logical channel is a first air interface, and an air interface corresponding to a second-type logical channel is a second air interface, wherein when the at least one logical channel comprises the first-type logical channel and the second-type logical channel, wherein the sending, by the mobile terminal, the BSR to the base station based on resources of the two types of air interfaces and the correspondence comprises:
determining, by the mobile terminal based on the correspondence, that the air interface corresponding to the first-type logical channel is the first air interface and the air interface corresponding to the second-type logical channel is the second air interface,
determining, by the mobile terminal, whether the second air interface and the first air interface have an available uplink resource for sending a BSR of the first-type logical channel and a BSR of the second-type logical channel.

2. The method according to claim 1, wherein a subframe length of the first air interface is greater than a subframe length of the second air interface.

3. The method according to claim 2, wherein when the at least one logical channel comprises the first-type logical channel and the second-type logical channel, the sending, by the mobile terminal, the BSR to the base station based on resources of the two types of air interfaces and the correspondence further comprises:
when the second air interface has the available uplink resource for sending the BSR of the first-type logical channel and the BSR of the second-type logical channel,
sending, by the mobile terminal, the BSR of the first-type logical channel and the BSR of the second-type logical channel to the base station by using an uplink resource of the second air interface, or
sending, by the mobile terminal, the BSR of the second-type logical channel to the base station by using an uplink resource of the second air interface, and sending the BSR of the first-type logical channel to the base station by using an uplink resource of the first air interface.

4. The method according to claim 2, wherein the sending, by the mobile terminal, the BSR to the base station based on resources of the two types of air interfaces and the correspondence further comprises:
when the second air interface does not have the available uplink resource for sending the BSR of the first-type logical channel and the BSR of the second-type logical channel, sending, by the mobile terminal, a scheduling request to the base station through the second air interface;
receiving, by the mobile terminal, an uplink grant for the second air interface sent by the base station based on the scheduling request; and
sending, by the mobile terminal, the BSR of the first-type logical channel and the BSR of the second-type logical channel to the base station by using an uplink resource granted to the second air interface; or
sending, by the mobile terminal, the BSR of the second-type logical channel to the base station by using an uplink resource granted to the second air interface, and sending the BSR of the first-type logical channel to the base station by using an uplink resource of the first air interface.

5. The method according to claim 2, wherein the sending, by the mobile terminal, the BSR to the base station based on resources of the two types of air interfaces and the correspondence further comprises:
when an uplink resource of the second air interface is sufficient for sending only some BSRs in the BSR of the first-type logical channel and the BSR of the second-type logical channel, sending, by the mobile terminal, a BSR of a logical channel whose priority is relatively high to the base station by using the uplink resource of the second air interface, or sending, by the mobile terminal, the BSR of the second-type logical channel to the base station by using the uplink resource of the second air interface; or
when the first air interface has the available uplink resource, sending, by the mobile terminal, a BSR of a remaining logical channel by using an uplink resource of the first air interface, wherein the remaining logical channel is a logical channel, in the at least one logical channel, other than a logical channel sent on the second air interface; or
when the first air interface does not have the available uplink resource, sending, by the mobile terminal, a BSR of the remaining logical channel to the base station by using an uplink resource allocated by the base station based on a BSR sent on the second air interface.

6. The method according to claim 2, wherein the sending, by the mobile terminal, the BSR to the base station based on resources of the two types of air interfaces and the correspondence further comprises:
when both the second air interface and the first air interface have the available uplink resource for sending the BSR of the first-type logical channel and the BSR of the second-type logical channel, sending, by the mobile terminal, the BSR of the second-type logical channel to the base station through the second air interface, and sending, by the mobile terminal, the BSR of the first-type logical channel to the base station by using an uplink resource of the first air interface; or
when the second air interface does not have the available uplink resource and the first air interface has the available uplink resource, requesting, by the mobile terminal, the base station to allocate an uplink resource to the second air interface, sending the BSR of the second logical channel to the base station by using the uplink resource of the second air interface that is allocated by the base station, and sending, by the mobile terminal, the BSR of the first-type logical channel to the base station by using an uplink resource of the first air interface; or when the first air interface does not have the available uplink resource and the second air interface has the available uplink resource, requesting, by the mobile terminal, the base station to allocate an uplink resource to the first air interface, sending the BSR of the first logical channel to the base station by using the uplink resource of the first air interface that is allocated by the base station, and sending, by the mobile terminal, the BSR of the second logical channel to the base station by using an uplink resource of the second air interface.

7. A multi-air-interface communication method, comprising:

receiving, by a mobile terminal, a correspondence between each logical channel and each air interface that is sent by a base station, wherein the mobile terminal supports at least two types of air interfaces, and sending, by the mobile terminal, a buffer status report (BSR) to a base station based on resources of the two types of air interfaces and correspondence when data arrives at a buffer of at least one logical channel of the mobile terminal, wherein the BSR comprises information about the buffer of the at least one logical channel, wherein when the at least one logical channel comprises only a first-type logical channel, wherein an air interface corresponding to the first-type logical channel is a first air interface, wherein the sending, by the mobile terminal, the BSR to the base station based on resources of the two types of air interfaces and the correspondence comprises:

determining, by the mobile terminal based on the correspondence, that the air interface corresponding to the first-type logical channel is the first air interface;

determining, by the mobile terminal, whether the first air interface has an available uplink resource for sending a BSR of the first-type logical channel; and when the first air interface has the available uplink resource, sending, by the mobile terminal, the BSR of the first-type logical channel to the base station by using the available uplink resource of the first air interface; or when the first air interface does not have the available uplink resource, sending, by the mobile terminal, a scheduling request to the base station through the first air interface, and receiving uplink grant for the first air interface that is sent by the base station based on the scheduling request; and sending, by the mobile terminal, the BSR of the first-type logical channel to the mobile terminal by using an uplink resource granted to the first air interface.

8. A multi-air-interface communication method, comprising:

receiving, by a mobile terminal, a correspondence between each logical channel and each air interface that is sent by a base station, wherein the mobile terminal supports at least two types of air interfaces, and sending, by the mobile terminal, a buffer status report (BSR) to a base station based on resources of the two types of air interfaces and the correspondence when data arrives at a buffer of at least one logical channel of the mobile terminal, wherein the BSR comprises information about the buffer of the at least one logical channel, wherein an air interface corresponding to a first-type logical channel is a first air interface, and an air interface corresponding to a second-type logical channel is a second air interface, wherein when the at least one logical channel comprises only the second-type logical channel, wherein the sending, by the mobile terminal, the BSR to the base station based on resources of the two types of air interfaces and the correspondence comprises:

determining, by the mobile terminal based on the correspondence, that the air interface corresponding to the second-type logical channel is the second air interface;

determining, by the mobile terminal, whether the second air interface has an available uplink resource for sending a BSR of the second-type logical channel; and when the second air interface has the available uplink resource, sending, by the mobile terminal, the BSR of the second-type logical channel to the base station by using the available uplink resource of the second air interface; or when the second air interface does not have the available uplink resource, sending, by the mobile terminal, a scheduling request to the base station through the second air interface, and receiving uplink grant for the second air interface that is sent by the base station based on the scheduling request; and sending, by the mobile terminal, the BSR of the second-type logical channel to the mobile terminal by using an uplink resource granted to the second air interface.

9. A multi-air-interface communication method, comprising:

receiving, by a mobile terminal, a reference signal sent by a base station, wherein the mobile terminal supports at least two types of air interfaces; wherein the receiving, by the mobile terminal, the reference signal sent by the base station comprises:

receiving, by the mobile terminal, the reference signal sent by the base station on a first air interface;

learning, by the mobile terminal, of a downlink path loss of each type of the at least two types of air interfaces based on a measurement result of the reference signal, comprising:

estimating, by the mobile terminal, a downlink path loss of the first air interface based on the measurement result of the reference signal received on the first air interface, and determining, by the mobile terminal, that the downlink path loss of the first air interface is the downlink path loss of the each type of air interface; and learning, by the mobile terminal, of a power headroom report PHR of each type of the at least two types of air interfaces based on the downlink path loss of the each type of air interface, comprising:

calculating, by the mobile terminal, a PHR of the first air interface based on the downlink path loss of the first air interface, and determining, by the mobile terminal, that the PHR of the first air interface is a PHR of each air interface; and sending, by the mobile terminal the PHR of each type of air interface to the base station.

10. The method according to claim 9, wherein the first air interface is pre-configured for the mobile terminal by the base station, the first air interface is different from the at least two types of air interfaces supported by the mobile terminal, and the first air interface is used by the base station to send the reference signal, so that the mobile terminal calculates the downlink path loss.

11. The method according to claim 9, wherein the first air interface is a type of air interface in the at least two types of air interfaces supported by the mobile terminal.

12. A multi-air-interface communication method, comprising:

receiving, by a mobile terminal, an uplink grant sent by a base station, wherein the uplink grant comprises a first uplink grant of a first air interface and a second uplink grant of a second air interface;

determining, by the mobile terminal based on a pre-obtained correspondence between each logical channel and each air interface, a logical channel corresponding to the first air interface and a logical channel corresponding to the second air interface; and allocating, by the mobile terminal based on priorities of the logical channel corresponding to the first air interface and the logical channel corresponding to the second air interface, a resource of the first uplink grant of the first air interface and a resource of the second uplink grant of the second air interface to the logical channel corresponding to the first air interface and the logical channel corresponding to the second air interface, comprising:

allocating, by the mobile terminal based on the priority of the logical channel corresponding to the first air interface, the resource of the first uplink grant of the first air interface and/or the resource of the second uplink grant of the second air interface to the logical channel corresponding to the first air interface; and when there is a remaining resource in the resource of the first uplink grant of the first air interface and/or the resource of the second uplink grant of the second air interface, allocating, by the mobile terminal based on the priority of the logical channel corresponding to the second air interface, the remaining resource to the logical channel corresponding to the second air interface.

13. A multi-air-interface communication method, comprising:

receiving, by a mobile terminal, an uplink grant sent by a base station, where the uplink grant comprises a first uplink grant of a first air interface and a second uplink grant of a second air interface;

determining, by the mobile terminal based on a pre-obtained correspondence between each logical channel and each air interface, a logical channel corresponding to the first air interface and a logical channel corresponding to the second air interface; and allocating, by the mobile terminal based on priorities of the logical channel corresponding to the first air interface and the logical channel corresponding to the second air interface, a resource of the first uplink grant of the first air interface and a resource of the second uplink grant of the second air interface to the logical channel corresponding to the first air interface and the logical channel corresponding to the second air interface, comprising:

allocating, by the mobile terminal based on the priority of the logical channel corresponding to the second air interface, the resource of the second uplink grant of the second air interface and/or the resource of the first uplink grant of the first air interface to the logical channel corresponding to the second air interface; and when there is a remaining resource in the resource of the second uplink grant of the second air interface and/or the resource of the first uplink grant of the first air interface, allocating, by the mobile terminal based on the priority of the logical channel corresponding to the first air interface, the remaining resource to the logical channel corresponding to the first air interface.

* * * * *